US011956372B2

(12) United States Patent
Wei et al.

(10) Patent No.: US 11,956,372 B2
(45) Date of Patent: Apr. 9, 2024

(54) JUDGMENT METHOD FOR EDGE NODE COMPUTING RESULT TRUSTWORTHINESS BASED ON TRUST EVALUATION

(71) Applicant: CHONGQING UNIVERSITY OF POSTS AND TELECOMMUNICATIONS, Chongqing (CN)

(72) Inventors: Min Wei, Chongqing (CN); Er Xiong Liang, Chongqing (CN); Ping Wang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 257 days.

(21) Appl. No.: 17/418,250

(22) PCT Filed: Jul. 15, 2020

(86) PCT No.: PCT/CN2020/102198
§ 371 (c)(1),
(2) Date: Jun. 25, 2021

(87) PCT Pub. No.: WO2021/237898
PCT Pub. Date: Dec. 2, 2021

(65) Prior Publication Data
US 2022/0321355 A1    Oct. 6, 2022

(30) Foreign Application Priority Data

May 28, 2020    (CN) .......................... 202010469593.1

(51) Int. Cl.
*H04L 9/32*    (2006.01)
*H04L 9/40*    (2022.01)

(52) U.S. Cl.
CPC .......... *H04L 9/3247* (2013.01); *H04L 9/3239* (2013.01); *H04L 63/0236* (2013.01); *H04L 63/0281* (2013.01)

(58) Field of Classification Search
CPC . H04L 9/3247; H04L 9/3239; H04L 63/0236; H04L 63/0281; H04L 63/0245;
(Continued)

(56) References Cited

U.S. PATENT DOCUMENTS

| 10,904,082 B1* | 1/2021 | Muhammad ........ H04L 41/0869 |
| 2003/0037128 A1* | 2/2003 | Beadles ................. H04L 67/34 |
| | | 709/227 |

(Continued)

FOREIGN PATENT DOCUMENTS

| EP | 4002905 A1 * | 2/2022 | ............ H04W 12/60 |
| WO | WO 2015/022336 A1 * | 2/2015 | ............. G06Q 10/10 |
| WO | WO 2022/115644 A1 * | 6/2022 | ............. H04L 41/00 |

*Primary Examiner* — Christopher A Revak
(74) *Attorney, Agent, or Firm* — Michael D. Eisenberg

(57) ABSTRACT

The present invention relates to a judgment method for edge node computing result trustworthiness based on trust evaluation, and belongs to the technical field of data processing. By means of the present invention, a security mechanism for trustworthiness of a computing result output by an industrial edge node is guaranteed, the industrial edge node is prevented from outputting error data, and attacks of false data of malicious edge nodes are resisted, it is guaranteed that trustworthy computing results not be tampered are input in the industrial cloud, and a site device is made to receive correct computing results rather than malicious or meaningless messages, thereby improving efficiency and security of industrial production.

1 Claim, 5 Drawing Sheets

(58) Field of Classification Search
CPC ... H04L 63/1441; H04L 63/12; H04L 63/123; H04L 63/1408; H04L 63/20; H04L 67/12; G06F 21/64
See application file for complete search history.

(56) References Cited

U.S. PATENT DOCUMENTS

| | | | |
|---|---|---|---|
| 2013/0097056 A1* | 4/2013 | Sun | G06Q 10/00 709/204 |
| 2019/0020657 A1* | 1/2019 | Egner | H04W 12/009 |
| 2019/0141119 A1* | 5/2019 | Bernat | H04L 41/12 |
| 2021/0021609 A1* | 1/2021 | Smith | G06F 8/60 |
| 2022/0210142 A1* | 6/2022 | Sohail | H04L 9/3239 |
| 2022/0318082 A1* | 10/2022 | Slinger | G06F 11/0772 |

* cited by examiner

JUDGMENT METHOD FOR EDGE NODE COMPUTING RESULT TRUSTWORTHINESS BASED ON TRUST EVALUATION

FIELD OF INVENTION

The present invention belong to the technical field of data processing, and relate to a judgment method for edge node computing result trustworthiness based on trust evaluation.

BACKGROUND ART OF THE INVENTION

Edge computing is introduced into industrial networks, and data processing and storage are executed in network edges, so as to solve the problems of node request delay, overburden of cloud server storage and computing, and excessive pressure of network transmission bandwidth. Edge computing extends service resources of cloud computing to network edges, solving the problems of poor mobility of cloud computing, weak perception of geographic information and high delay. However, edge computing brings new challenges of security and privacy to edge nodes in industrial edge computing networks when applied to data analysis. It is a challenge to ensure integrity of data between an industrial cloud and edge nodes and correct computing results received by a site device while meeting a requirement of high timeliness in the industrial networks. Because the edge nodes directly access the Internet outward and then an industrial site device is directly exposed to the Internet, there is a big security risk, especially a data security problem.

At present, there are few studies on ensuring information trustworthiness of communication between industrial edge nodes and the industrial cloud at home and abroad, most studies pay attention to the fact that information is not tampered during transmission, but cannot ensure that computing results of the edge nodes are trustworthy, that is, computing results output by the edge nodes are correct. To solve the technical problem, the present invention designs a solution for ensuring that edge nodes output trustworthy computing results based on trust evaluation.

DISCLOSURE OF THE INVENTION in view of this, the purpose of the present invention is to provide a judgment method for edge node computing result trustworthiness based on trust evaluation.

To achieve the above purpose, the present invention provides the following technical solution:

A judgment method for edge node computing result trustworthiness based on trust evaluation, the method comprising following steps:

S1 Before Network Operation

Each edge node to be added transmits identity information $ID_{Ai}$ to an edge proxy for registration, a security administrator sets an error rate $ER_{Ai}$ of computing errors allowed to be caused by each edge node in an industrial production environment; the edge proxy marks evidence collected for which number of times with $\varepsilon$ ($\varepsilon=1, 2, \ldots, CN_\tau$), and marks trust associated information as a trust value computed in which round with $\tau$ ($\tau \in N$), where $\tau=0$ when an initial trust value is evaluated, $\tau \geq 1$ when the trust value is updated; $CN_\tau$ represents a total number of times of evidence collection required when the edge proxy computes a trust value in a $\tau^{th}$ round, and $t_\tau$ represents time when the edge proxy starts computing the trust value in the $\tau^{th}$ round. After verifying an identity of the edge node, the edge proxy starts evaluating an initial trust value of the edge node.

S11 Evidence Collection

The edge proxy starts evaluating the initial trust value of the edge node at $t_0$, the edge proxy randomly generates a to-be-computed data set $Data_{B\text{-}0}^{c\text{-}\varepsilon}=\{a_{0\text{-}0}^{\varepsilon}, a_{1\text{-}0}^{\varepsilon}, a_{2\text{-}0}^{\varepsilon}, \ldots, a_{l\text{-}0}^{\varepsilon}\}$, and generates a result set $Data_{B\text{-}0}^{r\text{-}\varepsilon}=\{b_{1\text{-}0}^{\varepsilon}, b_{2\text{-}0}^{\varepsilon}, b_{3\text{-}0}^{\varepsilon}, \ldots, b_{l\text{-}0}^{\varepsilon}\}$ after adjacent data are pairwise computed as a reference set, wherein this solution specifies that the number of times of evidence collection $CN_0$ required for initial trust value evaluation is 3.

The edge proxy transmits a to-be-computed set to the edge node, the edge node computes and then transmits a computing result set $Data_{Ai\text{-}0}^{r\text{-}\varepsilon}=\{c_{1\text{-}0}^{\varepsilon}, c_{2\text{-}0}^{\varepsilon}, c_{3\text{-}0}^{\varepsilon}, \ldots, c_{l\text{-}0}^{\varepsilon}\}$ and a computing result Hash value set $Data_{Ai\text{-}0}^{r\text{-}\varepsilon}=\{h_{1\text{-}0}^{\varepsilon}, h_{2\text{-}0}^{\varepsilon}, h_{3\text{-}0}^{\varepsilon}, \ldots, h_{l\text{-}0}^{\varepsilon}\}$ to the edge proxy.

According to the computing result set $Data_{Ai\text{-}0}^{r\text{-}\varepsilon}$ from the edge node, the edge proxy computes a Hash value $Data_{Ai\text{-}0}^{h'\text{-}\varepsilon}=\{h_{1\text{-}0}^{\varepsilon'}, h_{2\text{-}0}^{\varepsilon'}, h_{3\text{-}0}^{\varepsilon'}, \ldots, h_{l\text{-}0}^{\varepsilon'}\}$ corresponding thereto.

The edge proxy records time $t_{B\text{-}0}^{s\text{-}\varepsilon}$ when the to-be-collected set is transmitted for the $\varepsilon^{th}$ time, time $t_{B\text{-}0}^{r\text{-}\varepsilon}$ when computing is completed, and time $t_{Ai\text{-}0}^{r\text{-}\varepsilon}$ when a computing result of an edge node Ai is received, where i represents a number of nodes, $i=1, 2, \ldots, n$.

S12 Evidence Processing

The edge proxy processes the collected data as follows:

(1) accuracy represents a proportion of the number of correct computing results to the number of total data; an accuracy computing formula of evidence collection for the $\varepsilon^{th}$ time is as follows:

$$E_{Ai\text{-}\tau}^{ac\text{-}\varepsilon} = \frac{N_{Ai\text{-}\tau}^{ac\text{-}\varepsilon}}{l} \tag{1}$$

where $N_{Ai\text{-}\tau}^{ac\text{-}\varepsilon}$ represents identical number in a result set $Data_{B\text{-}\tau}^{r\text{-}\varepsilon}$ computed by the edge proxy in evidence collection for the $\varepsilon^{th}$ time and a result set $Data_{Ai\text{-}\tau}^{r\text{-}\varepsilon}$ computed by the edge node Ai, $\varepsilon$ represents evidence collected for the $\varepsilon^{th}$ time, $\tau$ represents trust computing in the $\tau^{th}$ round, and l represents a data amount in evidence collection each time;

(2) integrity represents a proportion of the number of complete data to the number of total data; an integrity computing formula of evidence collection for the $\varepsilon^{th}$ time is as follows:

$$E_{Ai\text{-}\tau}^{cm\text{-}\varepsilon} = \frac{N_{Ai\text{-}\tau}^{cm\text{-}\varepsilon}}{l} \tag{2}$$

where $N_{Ai\text{-}\tau}^{cm\text{-}\varepsilon}$ represents identical number in a result Hash value set $Data_{Ai\text{-}\varepsilon}^{h'\text{-}\varepsilon}$ computed by the edge proxy in evidence collection for the $\varepsilon^{th}$ time and a result Hash value set $Data_{Ai\text{-}\tau}^{h\text{-}\varepsilon}$ computed by the edge node Ai, $\varepsilon$ represents evidence collected for the $\varepsilon^{th}$ time, $\tau$ represents trust computing in the $\tau^{th}$ round, and l represents a data amount in evidence collection each time;

(3) timeliness represents a difference between a computing efficiency of the edge node Ai and a computing efficiency of the edge proxy; a timeliness computing formula of evidence collection for the $\varepsilon^{th}$ time is as follows:

$$E_{Ai\text{-}\tau}^{tm\text{-}\varepsilon} = T_{Ai\text{-}\tau}^{tm\text{-}\varepsilon} - T_{B\text{-}\tau}^{tm\text{-}\varepsilon} \tag{3}$$

where $T_{Ai\text{-}\tau}^{tm\text{-}\varepsilon}$ represents a computing efficiency of the edge node in evidence collection for the $\varepsilon^{th}$ time; $T_{B\text{-}\tau}^{tm\text{-}\varepsilon}$ represents a computing efficiency of the edge proxy in evidence collection for the $\varepsilon^{th}$ time, and $\tau$ represents trust computing in the $\tau^{th}$ round.

When the edge proxy evaluates the initial trust value, the edge proxy computes a computing efficiency $$T_{Ai\ 0}^{tm-\varepsilon} = \frac{t_{Ai-0}^{r-\varepsilon} - t_{B-0}^{s-\varepsilon}}{l}$$

of $CN_0$ edge nodes and a computing efficiency $$T_{B-0}^{tm-\varepsilon} = \frac{t_{B-0}^{r-\varepsilon} - t_{B-O}^{s-\varepsilon}}{l}$$

of the edge proxy according to the time $t_{B-0}^{s-\varepsilon}$ when the to-be-collected set is transmitted for $\varepsilon^{th}$ time, the time $t_{B-0}^{r-\varepsilon}$ when computing of the to-be-computed set is completed, and the time $t_{Ai-0}^{r-\varepsilon}$ when a computing result of an edge node Ai is received, substitutes the results into formula (3), and computes to obtain timeliness of the $CN_0$ edge nodes Ai.

When evaluating the initial trust value, the edge proxy processes evidence collected for three times by means of formula (1), formula (2) and formula (3), to obtain three values of each of accuracy, integrity and timeliness of the edge nodes Ai to be added.

S13 Initial Trust Evaluation

1) Computing Initial Trust Value

A direct trust value is a quantization value that indicates an ability of the edge node to complete a request task and is based on an interactive record history between the edge proxy and the edge node; when the edge proxy computes the initial trust value of the edge node, the edge node is in a to-be-operated state; the edge proxy conducts fuzzy evaluation on direct trust factors of edge nodes to be operated respectively, steps of computing direct trust values are as follow:

(a) determining a factor set $E=\{E_{Ai-\tau}^{ac-\varepsilon}, E_{Ai-\tau}^{cm-\varepsilon}, E_{Ai-\tau}^{tm-\varepsilon}\}$, and an evaluation set $V=\{V_1, V_2, V_3\}$, where $V_1$ represents untrustworthiness, $V_2$ represents uncertainty, and $V_3$ represents trustworthiness; it is stipulated that $\mu^{un}$ is an untrustworthy membership degree, and $0 \leq \mu^{un} < \beta_u$; $\mu^{in}$ is an uncertain membership degree, and $\beta_u \leq \mu^{in} < \beta_c$; $\mu^{cr}$ is a trustworthy membership degree, and $\beta_c \leq \mu^{cr} \leq 1$, where $\beta_u$ is untrustworthy threshold and $\beta_c$ is trustworthy threshold; the edge proxy computes membership degrees of accuracy, integrity and timeliness, computing formulae are as follows:

① computing formula of membership degree of accuracy in evidence collection for the $\varepsilon^{th}$ time is as follows:

$$\mu_{1-\tau}^{\varepsilon} = \begin{cases} 0, & E_{Ai-\tau}^{ac-\varepsilon} = 0 \\ [1 + 10(1 - E_{Ai-\tau}^{ac-\varepsilon})^2]^{-1}, & 0 < E_{Ai-\tau}^{ac-\varepsilon} \leq 1 \end{cases}$$

② computing formula of membership degree of integrity in evidence collection for the $\varepsilon^{th}$ time is as follows:

$$\mu_{2-\tau}^{\varepsilon} = \begin{cases} 0, & E_{Ai-\tau}^{cm-\varepsilon} = 0 \\ [1 + 10(1 - E_{Ai-\tau}^{cm-\varepsilon})^2]^{-1}, & 0 < E_{Ai-\tau}^{cm-\varepsilon} \leq 1 \end{cases}$$

③ computing formula of membership degree of timeliness in evidence collection for the $\varepsilon^{th}$ time is $$\mu_{3-\tau}^{\varepsilon} = [1 + \gamma \times (E_{Ai-\tau}^{tm-\varepsilon})^2]^{-1},$$

where $\gamma \frac{CPU \text{ clock speed of edge proxy 顶}}{CPU \text{ clock speed of edge node 流}}$ (b) computing proportions of membership degrees corresponding to accuracy, integrity and timeliness in trust computing in the $\tau^{th}$ round belonging to $V_1$, $V_2$, $V_3$, which are $\{r_{11-\tau}, r_{12-\tau}, r_{13-\tau}\}$, $\{r_{21-\tau}, r_{22-\tau}, r_{23-\tau}\}$ and $\{r_{31-\tau}, r_{32-\tau}, r_{33-\tau}\}$ respectively, for example, $$r_{11-\tau} = \frac{N(\mu_{1-\tau}^{un-\varepsilon})}{CN_\tau},$$

where $N(\mu_{1-\tau}^{un-\varepsilon})$ represents the number of accuracy membership degrees of $CN_\tau$ accuracy membership degrees within an untrustworthy membership degree range; the edge proxy obtains a judgment matrix $$R_\tau = \begin{bmatrix} r_{11-\tau} & r_{12-\tau} & r_{13-\tau} \\ r_{21-\tau} & r_{22-\tau} & r_{23-\tau} \\ r_{31-\tau} & r_{32-\tau} & r_{33-\tau} \end{bmatrix};$$

(c) computing weight corresponding to accuracy, integrity and timeliness using the entropy weight method, the computing steps being as follows:

① forming a matrix by $CN_\tau$ membership degrees $\mu_{1-\tau}^{\varepsilon}$, $\mu_{2-\tau}^{\varepsilon}$, $\mu_{3-\tau}^{\varepsilon}$, $\mu_{1-\tau}^{\varepsilon}$, $\mu_{2-\tau}^{\varepsilon}$, $\mu_{3-\tau}^{\varepsilon}$, $\mu_{1-\tau}^{\varepsilon}$, $\mu_{2-\tau}^{\varepsilon}$, $\mu_{3-\tau}^{\varepsilon}$ corresponding to accuracy, integrity and timeliness:

$$\begin{bmatrix} u_{1-\tau}^1 & \cdots & u_{1-\tau}^{\varepsilon} & \cdots & \mu_{1-\tau}^{CN_\tau} \\ u_{2-\tau}^1 & \cdots & u_{2-\tau}^{\varepsilon} & \cdots & \mu_{2-\tau}^{CN_\tau} \\ u_{3-\tau}^1 & \cdots & u_{3-\tau}^{\varepsilon} & \cdots & \mu_{3-\tau}^{CN_\tau} \end{bmatrix};$$

② computing information entropy corresponding to accuracy, integrity and timeliness:

$$E_{j-\tau} = -(\ln CN_\tau)^{-1} \sum_{\varepsilon=1}^{CN_\tau} (p_{j-\tau}^{\varepsilon}) \ln(p_{j-\tau}^{\varepsilon}), \text{ where}$$

$$p_{j-\tau}^{\varepsilon} = \frac{\mu_{j-\tau}^{\varepsilon}}{\sum_{\varepsilon=1}^{CN_\tau} \mu_{j-\tau}^{\varepsilon}}, (j = 1, 2, 3);$$

③ computing weight corresponding to accuracy, integrity and timeliness:

$$\alpha_{j-\tau} = \frac{1 - E_{j-\tau}}{3 - \sum_{j=1}^{3} E_{j-\tau}};$$

in order to avoid the condition where the weight is zero when the degree of dispersion of a certain factor is too small, weight ranges corresponding to accuracy, integrity and timeliness are $\alpha_1 \in [0.5, 0.8]$, $\alpha_2 \in [0.01, 0.2]$ and $\alpha_3 \in [0.2, 0.4]$ respectively, where $\alpha_1 > \alpha_3 > \alpha_2$; when the weight obtained using the entropy weight method is not within the specified range, the maximum value or minimum value of the corresponding range is taken, actual weight is $$\alpha'_{j-\tau} = \frac{\alpha_{j-\tau}}{\alpha_{1-\tau} + \alpha_{2-\tau} + \alpha_{3-\tau}}, A_\tau = \{\alpha'_{1-\tau}, \alpha'_{2-\tau}, \alpha'_{3-\tau}\};$$

(d) computing a judgment result $Z_{Ai-\tau} = A_\tau * R_\tau = \{z_{1-\tau}, z_{2-\tau}, z_{3-\tau}\}$, there being following three cases:

① when $z_{1-\tau}$ is the maximum, the edge node Ai is untrustworthy, the edge proxy does not compute an average membership degree of accuracy, integrity and timeliness;

② when $z_{2-\tau}$ is the maximum, the edge node Ai is uncertain in trust, the edge proxy computes means of membership degrees within a range $[\beta_u, \beta_c)$ corresponding to accuracy, integrity and timeliness, which are $$\overline{\mu_{1-\tau}} = \frac{\sum_{\varepsilon=1}^{CN_\tau} \mu_{1-\tau}^{in-\varepsilon}}{N(\mu_{1-\tau}^{in-\varepsilon})}, \overline{\mu_{2-\tau}} = \frac{\sum_{\varepsilon=1}^{CN_\tau} \mu_{2-\tau}^{in-\varepsilon}}{N(\mu_{2-\tau}^{in-\varepsilon})}, \overline{\mu_{3-\tau}} = \frac{\sum_{\varepsilon=1}^{CN_\tau} \mu_{3-\tau}^{in-\varepsilon}}{N(\mu_{3-\tau}^{in-\varepsilon})},$$

$$\overline{\mu_{1-\tau}} = \frac{\sum_{\varepsilon=1}^{CN_\tau} \mu_{1-\tau}^{in-\varepsilon}}{N(\mu_{1-\tau}^{in-\varepsilon})}, \overline{\mu_{2-\tau}} = \frac{\sum_{\varepsilon=1}^{CN_\tau} \mu_{2-\tau}^{in-\varepsilon}}{N(\mu_{2-\tau}^{in-\varepsilon})}, \overline{\mu_{3-\tau}} = \frac{\sum_{\varepsilon=1}^{CN_\tau} \mu_{3-\tau}^{in-\varepsilon}}{N(\mu_{3-\tau}^{in-\varepsilon})},$$

$$\overline{\mu_{1-\tau}} = \frac{\sum_{\varepsilon=1}^{CN_\tau} \mu_{1-\tau}^{in-\varepsilon}}{N(\mu_{1-\tau}^{in-\varepsilon})}, \overline{\mu_{2-\tau}} = \frac{\sum_{\varepsilon=1}^{CN_\tau} \mu_{2-\tau}^{in-\varepsilon}}{N(\mu_{2-\tau}^{in-\varepsilon})}, \overline{\mu_{3-\tau}} = \frac{\sum_{\varepsilon=1}^{CN_\tau} \mu_{3-\tau}^{in-\varepsilon}}{N(\mu_{3-\tau}^{in-\varepsilon})},$$

where a denominator represents the number of membership degrees of all factors within the range $[\beta_u, \beta_c)$ and a numerator represents the sum of membership degrees of all factors within the range $[\beta_u, \beta_c)$; $\mu_{i-\tau}^{in-\varepsilon}$ is the membership degree of the accuracy of the $\tau^{th}$ evidence collection within the range $[\beta_u, \beta_c)$, $\mu_{2-\tau}^{in-\varepsilon}$ is the membership degree of the integrity of the $\tau^{th}$ evidence collection within the range $[\beta_u, \beta_c)$, $\mu_{2-\tau}^{in-\varepsilon}$ is the membership degree of the timeliness of the $\tau^{th}$ evidence collection within the range $[\beta_u, \beta_c)$;

③ when $z_{3-z}$ is the maximum, the edge nodes Ai is trustworthy, the edge proxy computes means of membership degrees within a range $[\beta_c, 1]$ corresponding to accuracy, integrity and timeliness, which are $$\overline{\mu_{1-\tau}} = \frac{\sum_{\varepsilon=1}^{CN_\tau} \mu_{1-\tau}^{cr-\varepsilon}}{N(\mu_{1-\tau}^{cr-\varepsilon})}, \overline{\mu_{2-\tau}} = \frac{\sum_{\varepsilon=1}^{CN_\tau} \mu_{2-\tau}^{cr-\varepsilon}}{N(\mu_{2-\tau}^{cr-\varepsilon})}, \overline{\mu_{3-\tau}} = \frac{\sum_{\varepsilon=1}^{CN_\tau} \mu_{3-\tau}^{cr-\varepsilon}}{N(\mu_{3-\tau}^{cr-\varepsilon})},$$

where a denominator represents the number of membership degrees of all factors within the range $[\beta_c, 1]$ and a numerator represents the sum of the membership degrees of all factors within the range $[\beta_c, 1]$; $\mu_{1-\tau}^{cr-\varepsilon}$ is the membership degree of the accuracy of the $\tau^{th}$ evidence collection within the range $[\beta_c, 1]$, $\mu_{2-\tau}^{cr-\varepsilon}$ is the membership degree of the integrity of the $\tau^{th}$ evidence collection within the range $[_c, 1]$, $\mu_{3-\tau}^{cr-\varepsilon}$ is the membership degree of the timeliness of the $\tau^{th}$ evidence collection within the range $[\beta_c, 1]$;

(e) the edge proxy computes a direct trust value $\text{Trust}_{Ai-\tau}^{cd}$ of the edge node Ai according to the average membership degree of accuracy, integrity and timeliness, and the weight thereof, the computing formula being as follows:

$$\text{Trust}_{Ai-\tau}^{cd} = \alpha_{1-\tau}^{cd} = \alpha_{1-\tau}\overline{\mu_{1-\tau}} + \alpha_{2-\tau}\overline{\mu_{2-T}} + \alpha_{3-\tau}\overline{\mu_{3-\tau}} \quad (4)$$

Since the edge nodes to be operated have no historical trust values and feedback scores, at this moment, the initial direct trust value is the final trust value, and the final trust value before the edge node Ai operates is $\text{Trust}_{Ai-0}^{u} = \text{Trust}_{Ai-0}^{cd}$.

2) Computing Trust Identifier

Edge node trust is divided into three levels, namely an untrustworthy level, an uncertain level and a trustworthy level.

A threshold of the untrustworthy level is $\beta_u$, a threshold of the trustworthy level is $\beta_c$, $0 < \beta_u < \beta_c \leq 1$ and $\beta_c = [1 + 10(ER_{Ai})^2]^{-1}$, $\beta_u = \beta_c - 0.2$, where $ER_{Ai}$ represents an error rate of computing errors allowed to be caused by each edge node Ai in an industrial production environment occasionally due to mistake, $0 \leq ER_{Ai} < 30\%$, the greater the $\beta_u$ and $\beta_c$, the sensitive the system to incorrect computing results; the security administrator sets an error rate of errors allowed to be caused by each edge node in an industrial production environment, and the edge proxy computes corresponding $\beta_u$ and $\beta_c$ according to the error rate.

The edge proxy computes a trust identifier of an edge node Ai to be operated according to a judgment result, the rules are as follows:

(a) For an edge node of which the trust value level is a trustworthy level, in order to prevent a malicious node from cheating trust, the edge proxy replaces a trust value of the edge node with a trustworthy level with $$\frac{\beta_u + \beta_c}{2},$$

that is, degrades the edge node with a trustworthy level to an edge node with an uncertain level.

(b) For an edge node of which the trust value level is an uncertain level, the edge proxy allocates a trust identifier $TI_{Ai-0} = 1$ of an initial trust value to the edge node, computes valid time $T_{Ai-0}^{v}$ of the initial trust identifier according to formula (5), and stores initial trust associated information locally;

a computing formula of the valid time $T_{Ai-0}^{v}$ of the trust identifier of the initial trust value is as follows:

$$T_{Ai-0}^{v} = 5i \times CN_0 \times \overline{T_{Ai-0}} \times l + 5\Delta T \quad (5)$$

where i represents the number of on-line edge nodes, $CN_0$ represents the number of times of evidence collection in initial trust evaluation, $\overline{T_{Ai-0}}$ represents an average computing efficiency $$\overline{T_{Ai-0}} = \frac{\sum_{\varepsilon=1}^{CN_0} T_{Ai-0}^{tm-\varepsilon}}{CN_0}$$

of the edge nodes Ai, l represents a data amount of evidence collection each time, $\Delta T$ represents a time interval between trust updates, and the valid time is in second; if a trust identifier of an edge node is expired, the edge proxy lists the edge node in a blacklist.

(c) For an edge node of which the trust level is an untrustworthy level, that is, an edge node of which the $z_{1-\tau}$ is the maximum, to avoid evaluation errors, the edge proxy repeats the above-mentioned steps of evidence collection, evidence processing and trust evaluation to evaluate the initial trust value thereof twice, if the trust value is still untrustworthy after being evaluated twice, reports to the security administrator to replace the edge node, and computes an initial trust value of the replaced edge node to be added.

Initial trust associated data of the edge node Ai includes initial trust value evaluation start time $t_0$, a node identity identifier $ID_{Ai}$, an accuracy membership degree mean $\bar{\mu}_{1\text{-}0}$, an integrity membership degree mean $\bar{\mu}_{2\text{-}0}$, a timeliness membership degree mean $\bar{\mu}_{3\text{-}0}$, an initial trust value $Trust_{Ai\text{-}0}{}^u$, a trust identifier $TI_{Ai\text{-}0}$ and valid time $T_{Ai\text{-}0}{}^v$.

The edge proxy transmits the trust identifier to a site device, the site device checks the trust identifier of the edge node to be operated and transmits data to an edge node with a trust identifier greater than 0, and then the edge node is in an operating state.

S2 After Network Operation

S21 Evidence Collection

After a network operates for $\Delta T$ time, the edge proxy initiates an update trust request to the site device, the edge proxy starts to collect the collected data of the site device, a computing result of the edge node and a Hash value thereof, and a feedback score from the site device, and records response time and a historical direct trust value of the edge node. After the edge proxy initiates the trust update request, the edge proxy conducts each evidence collection in following two cases:

case 1: the edge node directly returns the computing result to the site device, and the site device transmits the computing result of the edge node and the Hash value thereof to the edge proxy;

case 2: after preliminary computing, the edge node transmits the computing result and the Hash value thereof to the edge proxy, the edge proxy collects evidence and uploads the computing result of the edge node, trust identifier and signature to an industrial cloud, the industrial cloud checks the trust identifier of the edge node and verifies the signature and then further processes a preliminary computing result of the edge node, the industrial cloud transmits the computing result and signature to the edge proxy, the edge proxy verifies the signature and then transmits the computing result to the site device.

The edge proxy collects evidence data in the above two cases, and collects l evidence data as one evidence collection; each round of trust update requires evidence collection for $CN_\tau$ times, and the edge node is in an operating state at this moment; the edge proxy records the number of times of evidence collection with $\varepsilon(\varepsilon=1, 2, \ldots, CN_T)$; during the $\tau^{th}$ round of trust update, the edge proxy collects evidence for $CN_\tau$ times and then conducts evidence processing and trust update operations; a time interval between every two rounds of trust update is $\Delta T$; a computing formula of the number of times $CN_\tau$ of evidence collection required for the $\tau^h$ round of trust update is specified as follows:

$$CN_\tau = [6 \times \arctan[0.5 \times TI_{Ai\text{-}(\tau\text{-}1)}]] \quad (6)$$

The edge proxy computes the number of times of evidence collection $CN_\tau$ required for the $\tau^{th}$ round of trust update according to the trust identifier of the $(\tau-1)^{th}$ time; the edge proxy rapidly updates the trust value of the edge node when the trust identifier is small and the number of times of evidence collection is less; at the initial stage of network operation, the number of times of evidence collection increases with the increase of the number of trustworthy times, in order to update the trust value in time and reduce trust computing amount, the number of times of evidence collection cannot be infinitely increased, and the maximum value of the number of times of evidence collection $CN_\tau$ is $$\left[6 \times \frac{\pi}{2}\right] = 10.$$

1) Direct Trust Factor Collection

The site device transmits the collected data $\alpha_{0\text{-}\tau}{}^\varepsilon$ to the edge proxy and the edge node Ai simultaneity, the site device transmits a piece of data every $\Delta t$, and the edge proxy and the edge node start processing after receiving the second collected data; the edge proxy processes a computing result of the data collected in two consecutive times as $b_{\vartheta\text{-}\tau}{}^\varepsilon$, the edge node Ai processes a computing result of the data collected in two consecutive times as $c_{\vartheta\text{-}\tau}{}^\varepsilon$, $\vartheta$ represents a serial number of evidence collected in each evidence collection, ($\vartheta=1, 2, \ldots, l$); during each evidence collection, the site device needs to transmit (l+1) data, and the data transmitted by the site device form a set $Data_{D\text{-}\tau}{}^{c\text{-}\vartheta} = \{a_{0\text{-}\tau}{}^\varepsilon, a_{1\text{-}\tau}{}^\varepsilon, a_{2\text{-}\tau}{}^\varepsilon, \ldots, a_{l\text{-}\tau}{}^\varepsilon\}$.

At $t_T$, the edge proxy starts the $\tau^{th}$ round of trust update, the edge proxy collects evidence for $CN_\tau$ times in total, 1 data evidence collected for the $\varepsilon^{th}$ time including a computing result $Data_{B\text{-}\tau}{}^{r\text{-}\varepsilon} = \{b_{1\text{-}\tau}{}^\varepsilon, b_{2\text{-}\tau}{}^\varepsilon, \ldots, b_{\vartheta\text{-}\tau}{}^\varepsilon, \ldots, b_{l\text{-}\tau}{}^\varepsilon\}$ of the edge proxy, a computing result $Data_{Ai\text{-}\tau}{}^{r\text{-}\varepsilon} = \{c_{1\text{-}\tau}{}^\varepsilon, c_{2\text{-}\tau}{}^\varepsilon, \ldots, c_{\vartheta\text{-}\tau}{}^\varepsilon, \ldots, c_{l\text{-}\tau}{}^\varepsilon\}$ of the edge node Ai and a Hash value $Data_{Ai\text{-}\tau}{}^{h\text{-}\varepsilon} = \{h_{1\text{-}\tau}{}^\varepsilon, h_{2\text{-}\tau}{}^\varepsilon, \ldots, h_{\vartheta\text{-}\tau}{}^\varepsilon, \ldots, h_{l\text{-}\tau}{}^\varepsilon\}$ thereof, and a corresponding Hash value $Data_{Ai\text{-}\tau}{}^{h'\text{-}\varepsilon} = \{h_{1\text{-}\tau}{}^{\varepsilon'}, h_{2\text{-}\tau}{}^{\varepsilon'}, \ldots, h_{\vartheta\text{-}\tau}{}^{\varepsilon'}, \ldots, h_{l\text{-}\tau}{}^{\varepsilon'}\}$ computed by the edge proxy according to the computing result set $Data_{Ai\text{-}\tau}{}^{h'\text{-}\varepsilon}$ of the edge node Ai; the edge proxy records time $t_{D\text{-}\tau}{}^{s\text{-}\varepsilon}$ of transmitting the first data by the site device when collecting evidence for the $\varepsilon^{th}$ time, time $t_{B\text{-}\tau}{}^{r\text{-}\varepsilon}$ computing the $l^{th}$ result by the edge proxy, and time $t_{Ai\text{-}\tau}{}^{r\text{-}\varepsilon}$ computing the $l^{th}$ result by the edge node Ai.

2) Historical Direct Trust Value Collection

Because trust dynamically changes with time, in order to avoid malicious acts, the edge proxy uses a historical direct trust value to correct a direct trust value, and the edge proxy uses a sliding window to store the historical direct trust value so as to reduce the influence of the old direct trust value on the new direct trust value. Each edge node has a sliding storage window, the larger the window, the more the storage and computing overhead, so a short and small sliding storage window can limit the amount of trust computing and improve the efficiency of trust evaluation.

The sliding storage window includes u panes, each pane retains a historical direct trust value, that is, a direct trust value before the $\tau^{th}$ round of trust update is stored in the sliding storage window; a direct trust value stored in the k pane is $Trust_{Ai\text{-}(\tau\text{-}u+k\text{-}1)}{}^{cd}$; only when each pane has a direct trust value, the window begins to move, and moves one pane every time; a new direct trust value is added into the window after the trust is updated, while an expired direct trust value is extruded out of the window; during the $\tau^{th}$ round of trust update, direct trust values from the $(\tau-u)^{th}$ round of trust update to the $(\tau-_1)^{th}$ round of trust update are stored in the window, and a direct trust value of the $\tau^{th}$ round is stored in the sliding storage window after the $\tau^{th}$ round of trust update; when a trust identifier of the edge node Ai is equal to 0, the edge node is regarded as a malicious node, and the edge proxy deletes a sliding storage window thereof.

3) Feedback Score Collection

The edge proxy updates a final trust value of an edge node in an operating state and also needs to take into account a feedback score given to a computing result of the edge node by the site device; a rule of giving scores to edge nodes by the site device is as follows: if a safety accident occurs, the site device feeds back $d_{\vartheta-\tau}^{\varepsilon}=-1$ regardless whether a trust update is being conducted, and the edge proxy lists an edge node corresponding to the feedback score in a blacklist; otherwise, the site device feeds back scores given to computing results: bad review $d_{\vartheta-\tau}^{\varepsilon}=0$ and good review $d_{\vartheta-\tau}^{\varepsilon}=1$.

The site device feeds back the scores given to the computing results to the edge proxy, during the $\tau^{th}$ round of trust update, the edge proxy collects for $CN_\tau$ times and collects 1 feedback scores each time, and a feedback score collected by the edge proxy for the $\varepsilon^{th}$ time is $Data_{Ai-\tau}^{f-\varepsilon}=\{d_{1-\tau}^{\varepsilon}, d_{2-\tau}^{\varepsilon}, \ldots, d_{\vartheta-\tau}^{\varepsilon}, \ldots, d_{l-\tau}^{\varepsilon}\}$ including scores given, by the site device, to computing results directly returned by v edge nodes to the site device and scores given, by the site device, to computing results transmitted by (l−v) edge nodes to the industrial cloud for processing and then returned to the site device; a proxy signature based on elliptic curve is used to make the communication between the edge nodes and the industrial cloud trustworthy, no matter the computing results received by the site device come from the edge nodes or the industrial cloud, the objects to which the site device feeds back scores are edge nodes.

S22 Evidence Processing

1) Direct Trust Factor Processing

After collecting evidence for $CN_\tau$ times, the edge proxy respectively computes accuracy, integrity and timeliness of an edge node Ai during each evidence collection in the $\tau^{th}$ round of trust update:
(a) the edge proxy computes accuracy of the edge node Ai according to formula (1);
(b) the edge proxy computes integrity of the edge node Ai according to formula (2);
(c) according to the time $t_{D-\tau}^{s-\varepsilon}$ of transmitting the first data by the site device when collecting evidence for the $\varepsilon^{th}$ time, the time $t_{B-\tau}^{r-\varepsilon}$ of computing the $l^{th}$ result by the edge proxy, and the time $t_{Ai-\tau}^{r-\varepsilon}$ computing the $l^{th}$ result by the edge node Ai, the edge proxy computes a computing efficiency $$T_{Ai-\tau}^{tm-\varepsilon} = \frac{t_{Ai-\tau}^{r-\varepsilon} - t_{D-\tau}^{s-\varepsilon}}{l}$$

of the edge node and a computing efficiency $$T_{B-\tau}^{tm-\varepsilon} = \frac{t_{B-\tau}^{r-\varepsilon} - t_{D-\tau}^{s-\varepsilon}}{l}$$

of the edge proxy, substitutes $T_{Ai-\tau}^{tm-\varepsilon}$, $T_{B-\tau}^{tm-\varepsilon}$, $T_{Ai-\tau}^{tm-\varepsilon}$, $T_{B-\tau}^{tm-\varepsilon}$ into formula (3), and compute timeliness of the edge node Ai.

When conducting the $\tau^{th}$ round of trust update, the edge proxy processes the collected direct trust factors by means of formula (1), formula (2) and formula (3), to obtain $CN_\tau$ values of each of accuracy, integrity and timeliness of an edge node Ai to be examined.

2) Historical Trust Value Processing

For weight factors of historical direct trust values at different time, there is a need to take into account a time factor, that is, the longer the time of the trust value, the lower the proportion; a weight of the $k^{th}$ pane of the sliding storage window is:

$$\varphi_k = e^{-\rho(u-k)} \qquad (7)$$

where ρ represents an attenuation coefficient which is 0.3; if the sliding storage window is not fully stored, u is the number of actual historical direct trust values;

according to the historical direct trust value and weight thereof in the sliding storage window, the edge proxy computes a weighted average historical trust value $Trust_{Ai-\tau}^{hd}$ of the edge node Ai in the $\tau^{th}$ round of trust update:

$$Trust_{Ai-\tau}^{hd} = \frac{\sum_{k=1}^{u} \varphi_k \times Trust_{Ai-(\tau-u+k-1)}^{cd}}{\sum_{k=1}^{u} \varphi_k} \qquad (8)$$

3) Feedback Score Processing

For an edge node with a feedback score of −1, the security administrator replaces the edge node with an edge node to be added, and the edge proxy repeats an initial trust value computing step, to evaluate an initial trust value of the edge node to be added.

According to the feedback score, the edge proxy computes reward and penalty factors of the edge node Ai in the $\tau^{th}$ round of trust update; and according to a difference $\Delta N_{Ai-t}^{\varepsilon}=N_{Ai-\tau}^{g-\varepsilon}-\lfloor l\times(1-ER_{Ai})\rfloor$ between the total number of times of good review $N_{Ai-\tau}^{g-\varepsilon}$ during evidence collection for the $\varepsilon^{th}$ time and the minimum required number of correct computing results, the edge proxy computes a reward factor $E_{Ai-\tau}^{g-\varepsilon}$ and a penalty factor $E_{Ai-\tau}^{b-\varepsilon}$ corresponding to the evidence collection for the $\varepsilon^{th}$ time, where $N_{Ai-\tau}^{g-\varepsilon} = \Sigma_{\vartheta=1}^{l} d_{\vartheta-\tau}^{\varepsilon}$, $ER_{Ai}$ is the error rate that the edge node is allowed to calculate in an industrial production environment.

If $\Delta N_{Ai-\tau}^{\varepsilon} \geq 0$, the reward factor and penalty factor corresponding to the evidence collection for the $\varepsilon^{th}$ time are $E_{Ai-\tau}^{g-\varepsilon}=0.3[(1+e^{-\Delta N_{Ai-\tau}^{\varepsilon}})^{-1}-0.5]$ and $E_{Ai-\tau}^{b-\varepsilon}=0$ respectively; otherwise, the reward factor and penalty factor corresponding to the evidence collection for the $\varepsilon^{th}$ time are $E_{Ai-\tau}^{g-\varepsilon}=0$ and $E_{Ai-\tau}^{b-\varepsilon}=0.4[(1+e^{-\Delta N_{Ai-\tau}^{\varepsilon}})^{-1}-0.5]$ respectively; the reward degree is small and the penalty degree is large, which reflects the characteristic that the trust value is slowly increased and quickly decreased.

The edge proxy computes a final reward or penalty factor $E_{Ai-\tau}^{f}$ according to the reward and penalty factors in the $\tau^{th}$ round of trust update:

$$E_{Ai-\tau}^{f} = \begin{cases} 0, & \exists d_{\vartheta-\tau}^{\varepsilon} = -1 \\ \frac{\sum_{\varepsilon=1}^{CN_\tau}[E_{Ai-\tau}^{g-\varepsilon} + E_{Ai-\tau}^{b-\varepsilon}]}{CN_\tau}, & \forall d_{\vartheta-\tau}^{\varepsilon} \neq -1 \end{cases} \qquad (9)$$

Good feedback from the field device increases the trust value of the edge node Ai and bad feedback rapidly decreases the trust value of the edge node Ai; if there is safety accident feedback from the site device, $E_{Ai-\tau}^{f}$ appears as a penalty factor, $E_{Ai-\tau}^{f}=0$; if there is no safety accident feedback, $E_{Ai-\tau}^{f}>0$ represents reward, $E_{Ai-\tau}^{f}<0$ represents penalty, and $E_{Ai-\tau}^{f}=0$ represents neither reward nor penalty.

S23 Trust Update

According to the direct trust value, historical trust value and feedback scores, the edge proxy updates the trust value of the edge node, the edge node is in a to-be-examined state at this moment; a time interval between every two rounds of trust updates is ΔT.

1) Computing Direct Trust Value

The edge proxy repeats the step of computing a direct trust value when evaluating initial trust, and computes a direct trust value $\text{Trust}_{Ai-\tau}^{cd}$ of the edge node Ai to be examined of which the judgment result is trustworthy or uncertain in the $\tau^{th}$ round of trust update by means of formula (4); for an edge node to be examined of which the judgment result is untrustworthy, the edge proxy directly lists the edge node in a blacklist.

2) Correcting Direct Trust Value

Before computing the final trust value, the edge proxy needs to correct the direct trust value by using the weighted average historical direct trust value; the edge proxy weights and aggregates $\text{Trust}_{Ai-\tau}^{cd}$ and $\text{Trust}_{Ai-\tau}^{hd}$ of the edge node Ai to obtain a corrected direct trust value $\text{Trust}_{Ai-\tau}^{d}$ the edge node Ai in the $\tau^{th}$ round of trust update:

$$\text{Trust}_{Ai-\tau}^{d}=\delta\times\text{Trust}_{Ai-\tau}^{cd}+(1-\delta)\times\text{Trust}_{Ai-\tau}^{hd} \quad (10)$$

where $\delta$ is used to balance proportions of current trust and historical trust, and $\delta$ is defined as follows:

$$\delta = \begin{cases} \delta_1, & \text{Trust}_{Ai-\tau}^{cd} \geq \text{Trust}_{Ai-\tau}^{hd} \\ \delta_2, & \text{Trust}_{Ai-\tau}^{cd} < \text{Trust}_{Ai-\tau}^{hd} \end{cases} \quad (11)$$

where $0<\delta_1<\delta_2<1$, it is specified that $\delta_1=0.3$, $\delta_2=0.7$, the value of $\delta_1$ is small, to prevent the edge node from accumulating trust thereof quickly, and the value of $\delta_2$ is large, which reflects a penalty for a malicious act of the edge node.

3) Updating Final Trust Value

According to the reward or penalty factor computed in formula (9), the edge proxy computes a final trust value of an edge node to be examined.

A computing formula of the final trust value $\text{Trust}_{Ai-\tau}^{u}$ of the edge node Ai in the $\tau^{th}$ round of trust update is as follows:

$$\text{Trust}_{Ai-\tau}^{u} = \begin{cases} E_{Ai-\tau}^{f}\times\text{Trust}_{Ai-\tau}^{d}, & \exists\, d_{\vartheta-\tau}^{\varepsilon}=-1 \\ E_{Ai-\tau}^{f}+\text{Trust}_{Ai-\tau}^{d}, & \forall\, d_{\vartheta-\tau}^{\varepsilon}\neq-1 \end{cases} \quad (12)$$

If a certain feedback score is −1, the final trust value of the edge node Ai in the $\tau^{th}$ round of trust update is equal to 0; otherwise, the final trust value of the edge node Ai in the $\tau^{th}$ round of trust update is equal to a corrected direct trust value of the edge node Ai plus a reward or penalty factor.

4) Computing Trust Identifier

After trust update, the edge proxy compares the final trust value of the edge node to be examined with a trust threshold (trust critical value) in Table 2-trust level table, and then computes a trust identifier of the edge node Ai according to the judgment result and the final trust value, rules are as follows:

(a) for an edge node of which the trust value level is a trustworthy level, the edge proxy computes a trust identifier $TI_{Ai-\tau}$ thereof according to formula (13), computes valid time $T_{Ai-\tau}^{v}$ the trust identifier according to formula (14), and then stores trust associated information thereof locally according to a data structure in Table 6;

a specific computing formula of the trust identifier of the edge node Ai in the $\tau^{th}$ round of trust update is as follows:

$$TI_{Ai-\tau} = \begin{cases} 0, & \text{Trust}_{Ai-\tau}^{d} < \beta_u \\ TI_{Ai-(\tau-1)}, & \beta_u \leq \text{Trust}_{Ai-\tau}^{d} < \beta_c \\ TI_{Ai-(\tau-1)}+1, & \text{Trust}_{Ai-\tau}^{d} \geq \beta_c \end{cases} \quad (13)$$

a computing formula of the valid time $T_{Ai-\tau}^{v}$ of the trust identifier of the trust value is as follows:

$$T_{Ai-\tau}^{v}=6\times CN_\tau\times l\times(\overline{T_{A1-\tau}}+\Delta t)+TI_{Ai-\tau}\times\Delta T \quad (14)$$

where $CN_\tau$ represents a number of times of evidence collection required in the $\tau^{th}$ round of trust update, l represents a data amount of evidence collection each time, $\overline{T_{A1-\tau}}$ represents an average computing efficiency $$\overline{T_{Ai-\tau}} = \frac{\sum_{\varepsilon=1}^{CN_\tau} T_{Ai-\tau}^{tm-\varepsilon}}{CN_\tau}$$

of edge nodes Ai, $\Delta t$ represents a time interval at which the site device transmits data, $\Delta T$ represents a time interval between trust updates, and the valid time is in second; if a trust identifier of an edge node is expired, the edge proxy lists the edge node in a blacklist;

(b) for an edge node of which the trust level is an uncertain level, a trust identifier thereof is unchanged; the edge proxy checks the trust identifier thereof, and if the number of times of continuous equality of the trust identifier is less than 3, the edge proxy allows the edge node to operate; otherwise, the edge proxy lists the edge node in a blacklist, and then the edge node is in an isolation state;

(c) for an edge node of which the trust level is an untrustworthy level, the edge proxy lists the edge node in a blacklist directly, and then the edge node is in an isolation state; the edge proxy broadcasts identity information about the edge node in the blacklist and a trust identifier 0 thereof, and reports to the security administrator to replace the edge node; after the security administrator replaces the isolated edge node with an edge node to be added, the edge proxy repeats an initial trust value computing step, to separately evaluate an initial trust value of the edge node to be added.

Trust associated data of the edge node Ai includes start time $t_\tau$ of the $\tau^{th}$ round of trust update, a node identity identifier $ID_{Ai}$, an average accuracy membership degree $\overline{\mu_{1-\tau}}$, an integrity membership degree mean $\overline{\mu_{2-\tau}}$, a timeliness membership degree mean $\overline{\mu_{3-\tau}}$, a corrected direct trust value $\text{Trust}_{Ai-\tau}^{d}$, a reward or penalty factor $E_{Ai-\tau}^{f}$, a final trust value $\text{Trust}_{Ai-\tau}^{u}$, a trust identifier $TI_{Ai-\tau}$ and valid time $T_{Ai-\tau}^{v}$.

The edge proxy transmits the trust identifier to the site device, the site device decides whether to transmit data according to the trust identifier of the edge node, and transmits data to an edge node with a trust identifier greater than 0 rather than to an edge node with a trust identifier equal to 0.

After $\Delta T$ time, the edge proxy repeatedly executes the steps of evidence collection, evidence processing and trust update, and so on.

The present invention has the advantageous effects that: by means of the present invention, a security mechanism for trustworthiness of a computing result output by an industrial edge node is guaranteed, the industrial edge node is prevented from outputting error data, and attacks of false data of a malicious edge node are resisted, it is guaranteed that trustworthy computing results not be tampered are input in the industrial cloud, and a site device is made to receive correct computing results rather than malicious or meaningless messages, thereby improving efficiency and security of industrial production.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, in the drawings.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Figure 1:
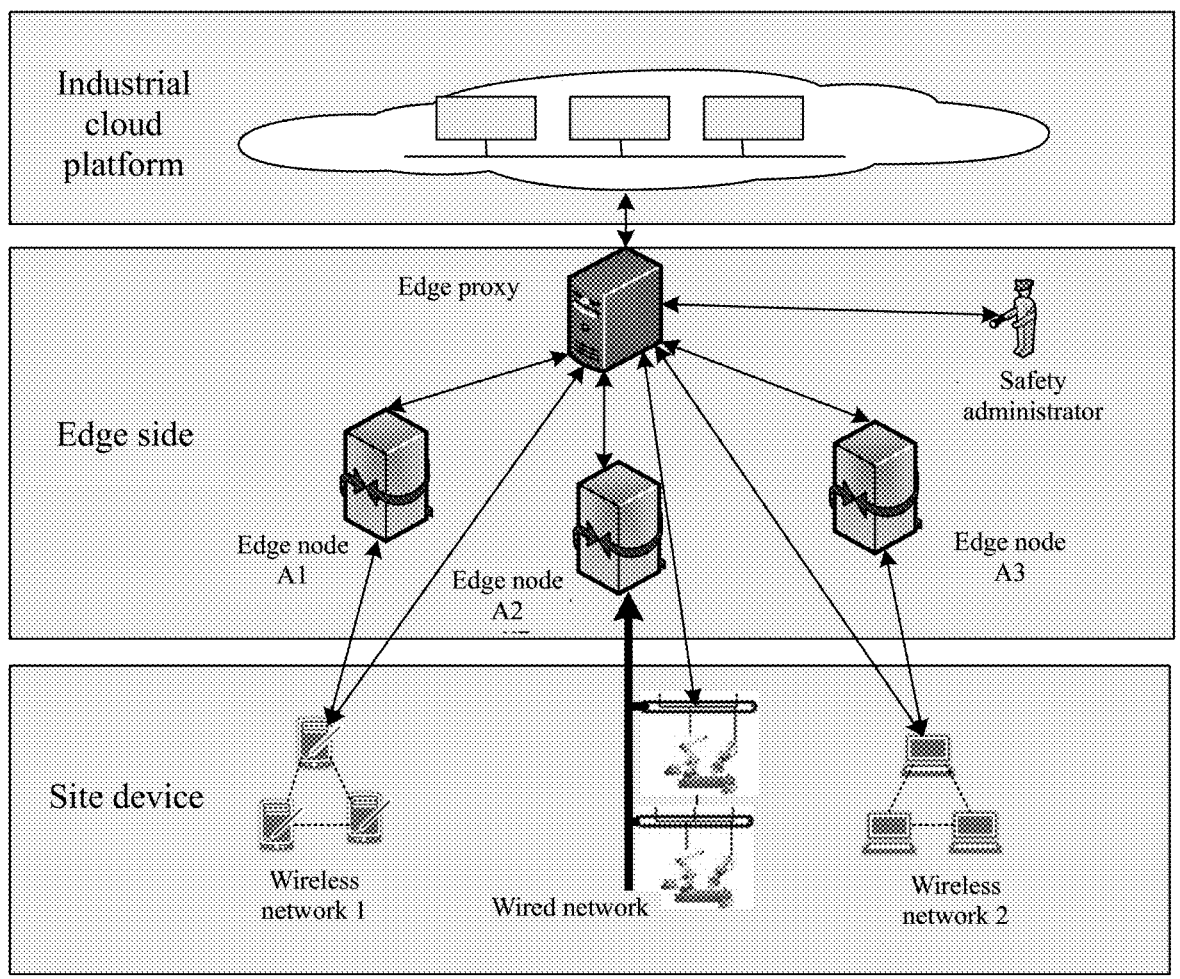
FIG. 1 is an industrial edge computing framework with a trust mechanism.

In an industrial edge computing environment, a site device transmits collected data to an edge node at an edge side, the edge node processes the data from the site device, then the edge node returns a computing result to the site device or transmits a preliminary computing result to an industrial cloud platform for further computing and then returns to the site device. In order to ensure that the computing result of the edge node is correct and the result is not forged or tampered in the process of transmission, failed edge nodes are identified and tamper, impersonation, replay and other attacks from malicious nodes are resisted, that is, it is guaranteed that the site device receives a trustworthy computing result, this article proposes an edge computing framework with a trust evaluation function. Trust evaluation of edge nodes is completed by an edge proxy at a network edge, and at the network edge, the response time for processing trust computing is shorter, the execution efficiency is higher, and the network pressure is lower, as shown in FIG. 1.

Assuming that the data collected by the site device is trustworthy, the communication between the site device and the edge node is trustworthy, and the communication between the site device and the edge proxy is trustworthy, the feedback of the site device is honest. In an industrial edge computing framework with a trust evaluation function, a trust evaluation method for ensuring edge node computing result trustworthiness is proposed. In the method, trust evaluation conducted on edge nodes is completed by an edge proxy according to objective analysis on computing results of the edge nodes and in conjunction with the fuzzy evaluation method and the entropy weight method. By comparing trust values of the edge nodes with a trust threshold, the edge proxy determines which edge nodes can receive computing tasks and transmit messages, thereby reducing untrustworthy data output by the edge side. In the trust evaluation method, the trust threshold is determined by an error rate of errors allowed to be caused by each edge node set by a security administrator.

After a network operates, if a computing result of an edge node needs to be further computed, in order to ensure that the interactive information between the edge node, the edge proxy and the industrial cloud platform is not tampered so that the site device can receive a trustworthy computing result, in the solution, the proxy signature scheme based on elliptic curve is used, so a preliminary computing result of a trustworthy edge node can be signed and then transmitted to the industrial cloud for further processing and then returned to the site device.

Figure 2:
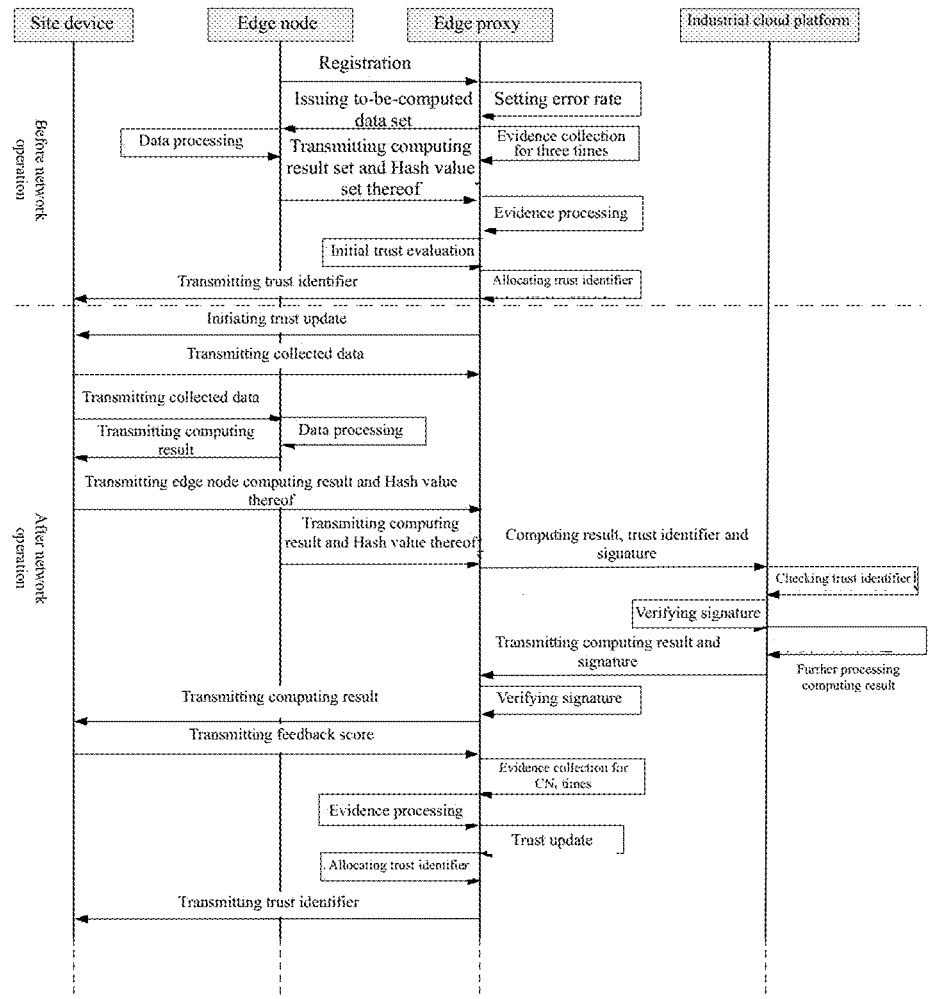
FIG. 2 is a flow chart of trust evaluation.
Figure 3:
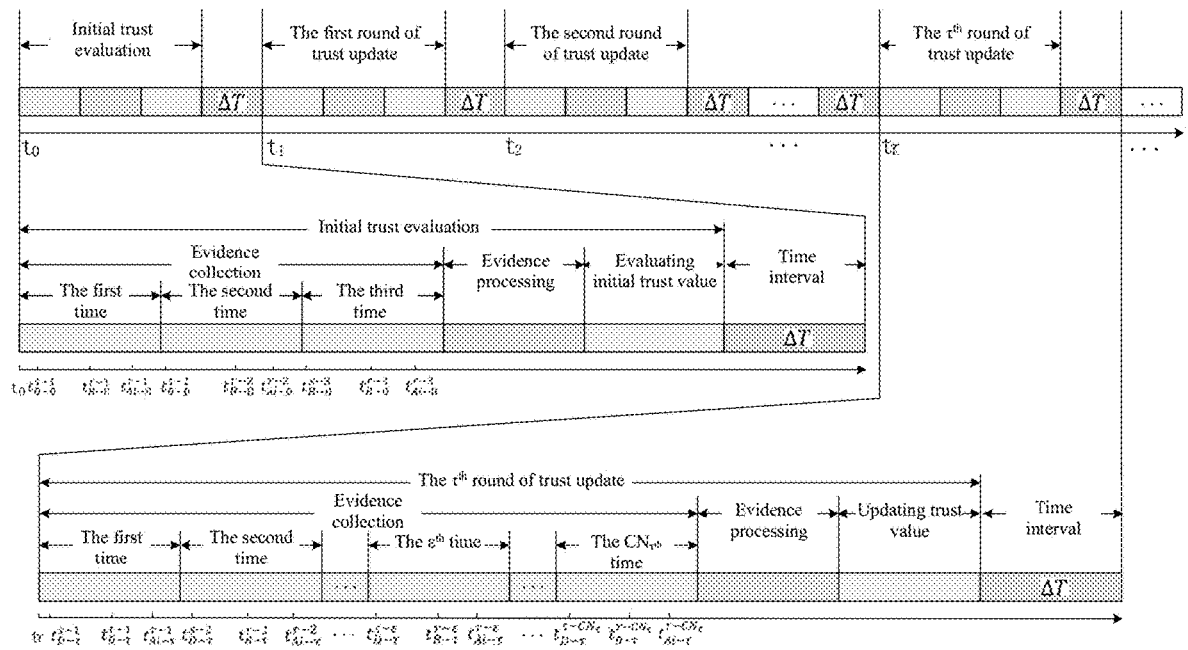
FIG. 3 is a sequence diagram of a trust evaluation process.

A specific trust evaluation flow of this solution is shown in FIG. 2 and FIG. 3.

Figure 4:
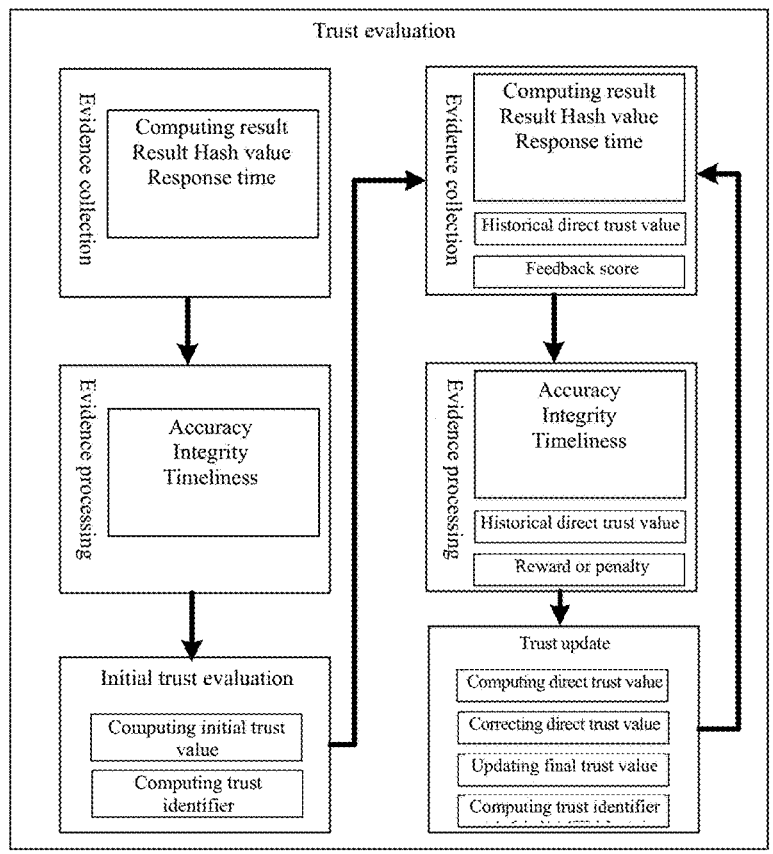
FIG. 4 is a trust evaluation framework and flow chart.

In this solution, trust is defined as evaluation conducted on edge node computing result trustworthiness by an edge proxy, and a trust value of an edge node is a quantitative form of long-term behavioral expression of the edge node. Trust evaluation consists of four modules: evidence collection, evidence processing, initial trust evaluation and trust update. FIG. 4 shows an overall framework and flow of trust evaluation.

Evidence comprises information of three dimensions: three available factors for directly evaluating edge node computing results, i.e. accuracy, integrity and timeliness of edge node computing results, used to compute direct trust values of edge nodes; historical trust values, wherein the edge proxy conducts weighted average on historical trust values in sliding windows and then corrects direct trust values; feedback scores given by the site device to the edge node computing results, wherein the edge proxy obtains a penalty or reward factor according to the feedback scores, used to compute final trust values of edge nodes. The trust evaluation process is divided into computing of initial trust values before network operation and update of trust values after network operation. The edge nodes have following five states in a trust evaluation process:

(1) to be added: an edge node to be added has no trust value, at this moment, the edge node computes to-be-computed data from the edge proxy;

(2) to be operated: the edge proxy computes an initial trust values of the edge node, at this moment, the edge node is in an to-be-operated state, to wait for an edge node to which the site device transmits data;

(3) operating: the edge proxy transmits a trust identifier of the edge node to be operated to the site device, a trustworthy edge node computes the data from the site device, and at this moment, the edge node is in an operating state;

(4) to be examined: after the network operates for a period of time, the edge proxy initiates trust update to the site device; when the edge proxy conducts trust update after collecting and processing evidence data, the edge node is in a to-be-examined state, the site device stops transmitting data to the edge node to be examined, until the site device receives the trust identifier;

(5) operating/isolating: after updating the trust value, the edge proxy allocates the trust identifier to the edge node to be examined, and transmits the trust identifier to the site device; the site device transmits data to an edge node of which the trust identifier is greater than 0, and at this moment, the edge node is in an operating state; the site device does not transmit data to an edge node with a trust identifier equal to 0, and at this moment, the edge node is listed in a blacklist by the edge proxy and is in an isolating state.

1.1 Trust Evaluation Flow 1.1.1 Before Network Operation

Each edge node to be added transmits identity information $ID_{Ai}$ to an edge proxy for registration, a security administrator sets an error rate $ER_{Ai}$ of computing errors allowed to be caused by each edge node in an industrial production environment; the edge proxy marks evidence collected for which number of times with $\varepsilon$ ($\varepsilon=1, 2, \ldots, CN$), and marks trust associated information as a trust value computed in which round with $\tau$ ($\tau \in N$), where $\tau=0$ when an initial trust value is evaluated, $\tau \geq 1$ when a trust value is updated; CN represents a total number of times of evidence collection required when the edge proxy computes a trust value in a $\tau^{th}$ round, and $t_\tau$ represents time when the edge proxy starts computing the trust value in the $\tau^{th}$ round. After verifying an identity of an edge node, the edge proxy starts evaluating an initial trust value of the edge node.

1 Evidence Collection

The edge proxy starts evaluating the initial trust value of the edge node at $t_0$, the edge proxy randomly generates a to-be-computed data set $Data_{B-0}^{c-\varepsilon}=\{a_{0-0}^{\varepsilon}, a_{1-0}^{\varepsilon}, a_{2-0}^{\varepsilon}, \ldots, a_{l-0}^{\varepsilon}\}$, and generates a result set $Data_{B-0}^{r-\varepsilon}=\{b_{1-0}^{\varepsilon}, b_{2-0}^{\varepsilon}, b_{3-0}^{\varepsilon}, \ldots, b_{l-0}^{\varepsilon}\}$ after adjacent data are pairwise computed as a reference set, wherein this solution specifies that the number of times of evidence collection $CN_0$ required for initial trust value evaluation is 3.

The edge proxy transmits a to-be-computed set to the edge node, the edge node computes and then transmits a computing result set $Data_{Ai-0}^{r-\varepsilon}=\{c_{1-0}^{\varepsilon}, c_{2-0}^{\varepsilon}, c_{3-0}^{\varepsilon}, \ldots, c_{l-0}^{\varepsilon}\}$ and a computing result Hash value set $Data_{Ai-0}^{r-\varepsilon}=\{h_{1-0}^{\varepsilon}, h_{2-0}^{\varepsilon}, h_{3-0}^{\varepsilon}, \ldots, h_{l-0}^{\varepsilon}\}$ to the edge proxy.

According to the computing result set $Data_{Ai-0}^{r-\varepsilon}$ from the edge node, the edge proxy computes a Hash value $Data_{Ai-0}^{r-\varepsilon}=\{h_{1-0}^{\varepsilon'}, h_{2-0}^{\varepsilon'}, h_{3-0}^{\varepsilon'}, \ldots, h_{l-0}^{\varepsilon'}\}$ corresponding thereto.

Figure 5:
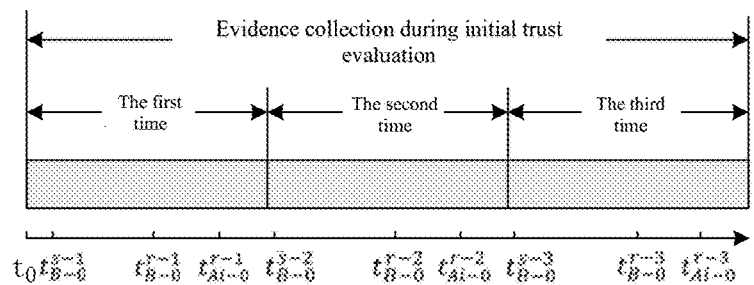
FIG. 5 is a sequence diagram showing a process of evidence collection in initial trust evaluation.

The edge proxy records time $t_{B-0}^{s-\varepsilon}$ when the to-be-collected set is transmitted for the $\varepsilon^{th}$ time, time $t_{B-0}^{r-\varepsilon}$ when computing is completed, and time $t_{Ai-0}^{r-\varepsilon}$ when a computing result of an edge node Ai is received, where i represents a number of nodes, i=1, 2, . . . , n. FIG. 5 shows an evidence collection process when the edge proxy evaluates an initial trust value.

2 Evidence Processing

The edge proxy evaluates whether computing results are trustworthy according to accuracy, integrity and timeliness of edge node computing results, these three parameters are available factors for evaluating edge node computing results, these factors can be regarded as trustworthy evidence of the edge nodes, and these evidences can be used to evaluate the edge node computing results objectively. These three data trust evidences are core dimensions for looking for trust relationships between data items and trusters.

Before the network operates, the edge proxy computes accuracy, integrity and timeliness of an edge node Ai according to a return result of an edge node Ai to be added. The edge proxy processes the collected data as follows:

(1) accuracy represents a proportion of the number of correct computing results to the number of total data; an accuracy computing formula of evidence collection for the $\varepsilon^{th}$ time is as follows:

$$E_{Ai-\tau}^{ac-\varepsilon} = \frac{N_{Ai-\tau}^{ac-\varepsilon}}{l} \quad (1)$$

where $N_{Ai-\tau}^{ac-\varepsilon}$ represents identical number in a result set $Data_{B-\tau}^{r-\varepsilon}$ computed by the edge proxy in evidence collection for the $\varepsilon^{th}$ time and a result set $Data_{Ai-\tau}^{r-\varepsilon}$ computed by the edge node Ai, $\varepsilon$ represents evidence collected for the $\varepsilon^{th}$ time, $\tau$ represents trust computing in the $\tau^{th}$ round, and l represents a data amount in evidence collection each time;

(2) integrity represents a proportion of the number of complete data to the number of total data; an integrity computing formula of evidence collection for the $\varepsilon^{th}$ time is as follows:

$$E_{Ai-\tau}^{cm-\varepsilon} = \frac{N_{Ai-\tau}^{cm-\varepsilon}}{l} \quad (2)$$

where $N_{Ai-\tau}^{cm-\varepsilon}$ represents identical number in a result Hash value set $Data_{Ai-\varepsilon}^{h'-\varepsilon}$ computed by the edge proxy in evidence collection for the $\varepsilon^{th}$ time and a result Hash value set $Data_{Ai-\tau}^{h-\varepsilon}$ computed by the edge node Ai, $\varepsilon$ represents evidence collected for the $\varepsilon^{th}$ time, $\tau$ represents trust computing in the $\tau^{th}$ round, and l represents a data amount in evidence collection each time;

(3) timeliness represents a difference between a computing efficiency of the edge node Ai and a computing efficiency of the edge proxy; a timeliness computing formula of evidence collection for the $\varepsilon^{th}$ time is as follows:

$$E_{Ai-\tau}^{tm-\varepsilon} = T_{Ai-\tau}^{tm-\varepsilon} - T_{B-\tau}^{tm-\varepsilon} \quad (3)$$

where $T_{Ai-\tau}^{tm-\varepsilon}$ represents a computing efficiency of the edge node in evidence collection for the $\varepsilon^{th}$ time; $T_{B-\tau}^{tm-\varepsilon}$ represents a computing efficiency of the edge proxy in evidence collection for the $\varepsilon^{th}$ time, and $\tau$ represents trust computing in the $\tau^{th}$ round.

When the edge proxy evaluates the initial trust value, the edge proxy computes a computing efficiency $$T_{Ai-0}^{tm-\varepsilon} = \frac{t_{Ai-0}^{r-\varepsilon} - t_{B-0}^{s-\varepsilon}}{l}$$

of $CN_0$ edge nodes and a computing efficiency $$T_{B-0}^{tm-\varepsilon} = \frac{t_{B-0}^{r-\varepsilon} - t_{B-0}^{s-\varepsilon}}{l}$$

of the edge proxy according to the time $t_{B-0}^{s-\varepsilon}$ when the to-be-collected set is transmitted for $\varepsilon^{th}$ time, the time $t_{B-0}^{r-\varepsilon}$ when computing of the to-be-computed set is completed, and the time $t_{Ai-0}^{r-\varepsilon}$ when a computing result of an edge node Ai is received, substitutes the results into formula (3), and computes to obtain timeliness of the $CN_0$ edge nodes Ai.

When evaluating the initial trust value, the edge proxy processes evidence collected for three times by means of formula (1), formula (2) and formula (3), to obtain three values of each of accuracy, integrity and timeliness of the edge nodes Ai to be added, as shown in Table 1.

TABLE 1

Direct Trust Factors of Edge Node Ai

| | Accuracy | Integrity | Timeliness |
|---|---|---|---|
| The first time | $E_{Ai-0}^{ac-1}$ | $E_{Ai-0}^{cm-1}$ | $E_{Ai-0}^{tm-1}$ |
| The second time | $E_{Ai-0}^{ac-2}$ | $E_{Ai-0}^{cm-2}$ | $E_{Ai-0}^{tm-2}$ |
| The third time | $E_{Ai-0}^{ac-3}$ | $E_{Ai-0}^{cm-3}$ | $E_{Ai-0}^{tm-3}$ |

3 Initial Trust Evaluation

1) Computing Initial Trust Value

A direct trust value is a quantization value that indicates an ability of the edge node to complete a request task and is based on an interactive record history between the edge proxy and the edge node. When the edge proxy computes the initial trust value of the edge node, the edge node is in a to-be-operated state. The edge proxy conducts fuzzy evaluation on direct trust factors of edge nodes to be operated respectively, steps of computing direct trust values are as follow:

(a) determining a factor set $E=\{E_{Ai-\tau}^{ac-\varepsilon}, E_{Ai-\tau}^{cm-\varepsilon}, E_{Ai-\tau}^{tm-\varepsilon}\}$, and an evaluation set $V=\{V_1, V_2, V_3\}$, where $V_1$ represents untrustworthiness, $V_2$ represents uncertainty, and $V_3$ represents trustworthiness; it is stipulated that $\mu^{un}$ is an untrustworthy membership degree, and $0 \leq \mu^{un} < \beta_u$; $\mu^{in}$ is an uncertain membership degree, and $\beta_u \leq \mu^{in} < \beta_c$; $\mu^{cr}$ is a trustworthy membership degree, and $\beta_c \leq \mu^{cr} \leq 1$, where $\beta_u$ is untrustworthy threshold and $\beta_c$ is trustworthy threshold; the edge proxy computes membership degrees of accuracy, integrity and timeliness, computing formulae are as follows:

① computing formula of membership degree of accuracy in evidence collection for the $\varepsilon^{th}$ time is as follows:

$$\mu_{1-\tau}^{\varepsilon} = \begin{cases} 0, & E_{Ai-\tau}^{ac-\varepsilon} = 0 \\ [1 + 10(1 - E_{Ai-\tau}^{ac-\varepsilon})^2]^{-1}, & 0 < E_{Ai-\tau}^{ac-\varepsilon} \leq 1 \end{cases}$$

② computing formula of membership degree of integrity in evidence collection for the $\varepsilon^{th}$ time is as follows:

$$\mu_{2-\tau}^{\varepsilon} = \begin{cases} 0, & E_{Ai-\tau}^{cm-\varepsilon} = 0 \\ [1 + 10(1 - E_{Ai-\tau}^{cm-\varepsilon})^2]^{-1}, & 0 < E_{Ai-\tau}^{cm-\varepsilon} \leq 1 \end{cases}$$

③ computing formula of membership degree of timeliness in evidence collection for the $\varepsilon^{th}$ time is $$\mu_{3-\tau}^{\varepsilon} = [1 + \gamma \times (E_{Ai-\tau}^{tm-\varepsilon})^2]^{-1}, \text{ where}$$

$$\gamma = \frac{CPU \text{ clock speed of edge proxy 濒}}{CPU \text{ clock speed of edge node 濒}}.$$

(b) computing proportions of membership degrees corresponding to accuracy, integrity and timeliness in trust computing in the $\tau^{th}$ round belonging to $V_1$, $V_2$, $V_3$, which are $\{r_{11-\tau}, r_{12-\tau}, r_{13-\tau}\}$, $\{r_{21-\tau}, r_{22-\tau}, r_{23-\tau}\}$ and $\{r_{31-\tau}, r_{32-\tau}, r_{33-\tau}\}$ respectively, for example, $$r_{11-\tau} = \frac{N(\mu_{1-\tau}^{un-\varepsilon})}{CN_\tau},$$

where $N(\mu_{1-\tau}^{un-\varepsilon})$ represents the number of accuracy membership degrees of $CN_\tau$ accuracy membership degrees within an untrustworthy membership degree range; the edge proxy obtains a judgment matrix $$R_\tau = \begin{bmatrix} r_{11-\tau} & r_{12-\tau} & r_{13-\tau} \\ r_{21-\tau} & r_{22-\tau} & r_{23-\tau} \\ r_{31-\tau} & r_{32-\tau} & r_{33-\tau} \end{bmatrix};$$

(c) computing weight corresponding to accuracy, integrity and timeliness using the entropy weight method, the computing steps being as follows:

① forming a matrix by $CN_\tau$ membership degrees $\mu_{1-\tau}^{\varepsilon}$, $\mu_{2-\tau}^{\varepsilon}$, $\mu_{3-\tau}^{\varepsilon}$, $\mu_{1-\tau}^{\varepsilon}$, $\mu_{2-\tau}^{\varepsilon}$, $\mu_{3-\tau}^{\varepsilon}$, $\mu_{1-\tau}^{\varepsilon}$, $\mu_{2-\tau}^{\varepsilon}$, $\mu_{3-\tau}^{\varepsilon}$ corresponding to accuracy, integrity and timeliness:

$$\begin{bmatrix} \mu_{1-\tau}^{1} & \cdots & \mu_{1-\tau}^{\varepsilon} & \cdots & \mu_{1-\tau}^{CN_\tau} \\ \mu_{2-\tau}^{1} & \cdots & \mu_{2-\tau}^{\varepsilon} & \cdots & \mu_{2-\tau}^{CN_\tau} \\ \mu_{3-\tau}^{1} & \cdots & \mu_{3-\tau}^{\varepsilon} & \cdots & \mu_{3-\tau}^{CN_\tau} \end{bmatrix};$$

② computing information entropy corresponding to accuracy, integrity and timeliness:

$$E_{j-\tau} = -(\ln CN_\tau)^{-1} \sum_{k=1}^{CN_\tau} (p_{j-\tau}^{\varepsilon}) \ln(p_{j-\tau}^{\varepsilon}), \text{ where}$$

$$p_{j-\tau}^{\varepsilon} = \frac{\mu_{j-\tau}^{\varepsilon}}{\sum_{k=1}^{CN_\tau} \mu_{j-\tau}^{\varepsilon}}, (j = 1, 2, 3);$$

③ computing weight corresponding to accuracy, integrity and timeliness:

$$\alpha_{j-\tau} = \frac{1 - E_{j-\tau}}{3 - \sum_{j=1}^{3} E_{j-\tau}},$$

in order to avoid the condition where the weight is zero when the degree of dispersion of a certain factor is too small, weight ranges corresponding to accuracy, integrity and timeliness are $\alpha_1 \in [0.5, 0.8]$, $\alpha_2 \in [0.01, 0.2]$ and $\alpha_3 \in [0.2, 0.4]$ respectively, where $\alpha_1 > \alpha_3 > \alpha_2$; when the weight obtained using the entropy weight method is not within the specified range, the maximum value or minimum value of the corresponding range is taken, actual weight is $$\alpha'_{j-\tau} = \frac{\alpha_{j-\tau}}{\alpha_{1-\tau} + \alpha_{2-\tau} + \alpha_{3-\tau}}, A_\tau = \{\alpha'_{1-\tau}, \alpha'_{2-\tau}, \alpha'_{3-\tau}\};$$

(d) computing a judgment result $Z_{Ai-\tau} = A_\tau * R_\tau = \{z_{1-\tau}, z_{2-\tau}, z_{3-\tau}\}$, there being following three cases:

① when $z_{1-\tau}$ is the maximum, the edge node Ai is untrustworthy, the edge proxy does not compute an average membership degree of accuracy, integrity and timeliness;

② when $z_{2-\tau}$ is the maximum, the edge node Ai is uncertain in trust, the edge proxy computes means of membership degrees within a range $[\beta_u, \beta_c)$ corresponding to accuracy, integrity and timeliness, which are $$\overline{\mu_{1-\tau}} = \frac{\sum_{\varepsilon=1}^{CN_\tau} \mu_{1-\tau}^{in-\varepsilon}}{N(\mu_{1-\tau}^{in-\varepsilon})}, \overline{\mu_{2-\tau}} = \frac{\sum_{\varepsilon=1}^{CN_\tau} \mu_{2-\tau}^{in-\varepsilon}}{N(\mu_{2-\tau}^{in-\varepsilon})}, \overline{\mu_{3-\tau}} = \frac{\sum_{\varepsilon=1}^{CN_\tau} \mu_{3-\tau}^{in-\varepsilon}}{N(\mu_{3-\tau}^{in-\varepsilon})},$$

$$\overline{\mu_{1-\tau}} = \frac{\sum_{\varepsilon=1}^{CN_\tau} \mu_{1-\tau}^{in-\varepsilon}}{N(\mu_{1-\tau}^{in-\varepsilon})}, \overline{\mu_{2-\tau}} = \frac{\sum_{\varepsilon=1}^{CN_\tau} \mu_{2-\tau}^{in-\varepsilon}}{N(\mu_{2-\tau}^{in-\varepsilon})}, \overline{\mu_{3-\tau}} = \frac{\sum_{\varepsilon=1}^{CN_\tau} \mu_{3-\tau}^{in-\varepsilon}}{N(\mu_{3-\tau}^{in-\varepsilon})},$$

$$\overline{\mu_{1-\tau}} = \frac{\sum_{\varepsilon=1}^{CN_\tau} \mu_{1-\tau}^{in-\varepsilon}}{N(\mu_{1-\tau}^{in-\varepsilon})}, \overline{\mu_{2-\tau}} = \frac{\sum_{\varepsilon=1}^{CN_\tau} \mu_{2-\tau}^{in-\varepsilon}}{N(\mu_{2-\tau}^{in-\varepsilon})}, \overline{\mu_{3-\tau}} = \frac{\sum_{\varepsilon=1}^{CN_\tau} \mu_{3-\tau}^{in-\varepsilon}}{N(\mu_{3-\tau}^{in-\varepsilon})},$$

where a denominator represents the number of membership degrees of all factors within the range $[\beta_u, \beta_c)$ and a numerator represents the sum of membership degrees of all factors within the range $[\beta_u, \beta_c)$; $\mu_{i-\tau}^{in-\varepsilon}$ is the membership degree of the accuracy of the $\tau^{th}$ evidence collection within the range $[\beta_u, \beta_c)$, $\mu_{2-\tau}^{in-\varepsilon}$ is the membership degree of the integrity of the $\tau^{th}$ evidence collection within the range $[\beta_u, \beta_c)$, $\mu_{2-\tau}^{in-\varepsilon}$ is the membership degree of the timeliness of the $\tau^{th}$ evidence collection within the range $[\beta_u, \beta_c)$;

③ when $z_{3-z}$ is the maximum, the edge nodes Ai is trustworthy, the edge proxy computes means of membership degrees within a range $[\beta_c, 1]$ corresponding to accuracy, integrity and timeliness, which are $$\overline{\mu_{1-\tau}} = \frac{\sum_{\varepsilon=1}^{CN_\tau} \mu_{1-\tau}^{cr-\varepsilon}}{N(\mu_{1-\tau}^{cr-\varepsilon})}, \overline{\mu_{2-\tau}} = \frac{\sum_{\varepsilon=1}^{CN_\tau} \mu_{2-\tau}^{cr-\varepsilon}}{N(\mu_{2-\tau}^{cr-\varepsilon})}, \overline{\mu_{3-\tau}} = \frac{\sum_{\varepsilon=1}^{CN_\tau} \mu_{3-\tau}^{cr-\varepsilon}}{N(\mu_{3-\tau}^{cr-\varepsilon})},$$

where a denominator represents the number of membership degrees of all factors within the range $[\beta_c, 1]$ and a numerator represents the sum of the membership degrees of all factors within the range $[\beta_c, 1]$; $\mu_{1-\tau}^{cr-\varepsilon}$ is the membership degree of the accuracy of the $\tau^{th}$ evidence collection within the range $[\beta_c, 1]$, $\mu_{2-\tau}^{cr-\varepsilon}$ is the membership degree of the integrity of the $\tau^{th}$ evidence collection within the range $[_c, 1]$, $\mu_{3-\tau}^{cr-\varepsilon}$ is the membership degree of the timeliness of the $\tau^{th}$ evidence collection within the range $[\beta_c, 1]$;

(e) the edge proxy computes a direct trust value $\text{Trust}_{Ai-\tau}^{cd}$ of the edge node Ai according to the average membership degree of accuracy, integrity and timeliness, and the weight thereof, the computing formula being as follows:

$$\text{Trust}_{Ai-\tau}^{cd} = \alpha_{1-\tau}^{cd} = \alpha_{1-\tau}\overline{\mu_{1-\tau}} + \alpha_{2-\tau}\overline{\mu_{2-T}} + \alpha_{3-\tau}\overline{\mu_{3-\tau}} \quad (4)$$

Since the edge nodes to be operated have no historical trust values and feedback scores, at this moment, the initial direct trust value is the final trust value, and the final trust value before the edge node Ai operates is $\text{Trust}_{Ai-0}^{u} = \text{Trust}_{Ai-0}^{cd}$.

2) Computing Trust Identifier

Table 2 is an edge node trust level table in which trust is divided into three levels, namely an untrustworthy level, an uncertain level and a trustworthy level.

TABLE 2

| Trust Level | Trust Description | Trust Value Range |
|---|---|---|
| 1 | Untrustworthy | $[0, \beta_u)$ |
| 2 | Uncertain | $[\beta_u, \beta_c)$ |
| 3 | Trustworthy | $[\beta_c, 1]$ |

A threshold of the untrustworthy level is $\beta_u$, a threshold of the trustworthy level is $\beta_c$, $0 < \beta_u < \beta_c \leq 1$ and $\beta_c = [1+10(ER_{Ai})^2]^{-1}$, $\beta_u = \beta_c - 0.2$, where $ER_{Ai}$ represents an error rate of computing errors allowed to be caused by each edge node Ai in an industrial production environment occasionally due to mistake, $0 \leq ER_{Ai} < 30\%$, the greater the $\beta_u$ and $\beta_c$, the sensitive the system to incorrect computing results; the security administrator sets an error rate of errors allowed to be caused by each edge node in an industrial production environment, and the edge proxy computes corresponding $\beta_u$ and $\beta_c$ according to the error rate, as shown in Table 3.

TABLE 3

| Values of $\beta_u$, $\beta_c$ (give an example) | | |
|---|---|---|
| Error rate • | $\beta_u$ | $\beta_c$ |
| 0 | 0.80 | 1.00 |
| 10% | 0.70 | 0.90 |
| 20% | 0.51 | 0.71 |

The edge proxy computes a trust identifier of an edge node Ai to be operated according to a judgment result, the rules are as follows:

(a) for an edge node of which the trust value level is a trustworthy level, in order to prevent a malicious node from cheating trust, the edge proxy replaces a trust value of the edge node with a trustworthy level with $$\frac{\beta_{3\varepsilon} + \beta_c}{2},$$

that is, degrades the edge node with a trustworthy level to an edge node with an uncertain level.

(b) for an edge node of which the trust value level is an uncertain level, the edge proxy allocates a trust identifier $TI_{Ai-0} = 1$ of an initial trust value to the edge node, computes valid time $T_{Ai-0}^{v}$ of the initial trust identifier according to formula (5), and stores initial trust associated information locally;

a computing formula of the valid time $T_{Ai\text{-}0}^{v}$ of the trust identifier of the initial trust value is as follows:

$$T_{Ai\text{-}0}^{v}=5i\times CN_0\times \overline{T_{Ai\text{-}0}}\times l+5\Delta T \quad (5)$$

where i represents the number of on-line edge nodes, $CN_0$ represents the number of times of evidence collection in initial trust evaluation, $\overline{T_{Ai\text{-}0}}$ represents an average computing efficiency $$\overline{T_{Ai\text{-}0}} = \frac{\sum_{\varepsilon=1}^{CN_0} T_{Ai\text{-}0}^{tm-E}}{CN_0}$$

of edge nodes Ai, l represents a data amount of evidence collection each time, $\Delta T$ represents a time interval between trust updates, and the valid time is in second; if a trust identifier of an edge node is expired, the edge proxy lists the edge node in a blacklist;

TABLE 4

Initial Trust Associated Data of Edge Node Ai

| Time | Node identity identifier | Accuracy membership degree mean | Integrity membership degree mean | Timeliness membership degree mean | Initial trust value | Trust identifier | Valid time |
|---|---|---|---|---|---|---|---|
| $t_0$ | $ID_{Ai}$ | $\overline{\mu_{1\text{-}0}}$ | $\overline{\mu_{2\text{-}0}}$ | $\overline{\mu_{3\text{-}0}}$ | $Trust_{Ai\text{-}0}^{u}$ | $TI_{Ai\text{-}0}$ | $T_{Ai\text{-}0}^{v}$ |

(c) for an edge node of which the trust level is an untrustworthy level, that is, an edge node of which the $z_{1\text{-}\tau}$ is the maximum, to avoid evaluation errors, the edge proxy repeats the above-mentioned steps of evidence collection, evidence processing and trust evaluation to evaluate the initial trust value thereof twice, if the trust value is still untrustworthy after being evaluated twice, reports to the security administrator to replace the edge node, and computes an initial trust value of the replaced edge node to be added.

The edge proxy transmits the trust identifier to a site device, the site device checks the trust identifier of the edge node to be operated and transmits data to an edge node with a trust identifier greater than 0, and then the edge node is in an operating state.

1.1.2 After Network Operation

1 Evidence Collection

Figure 6:
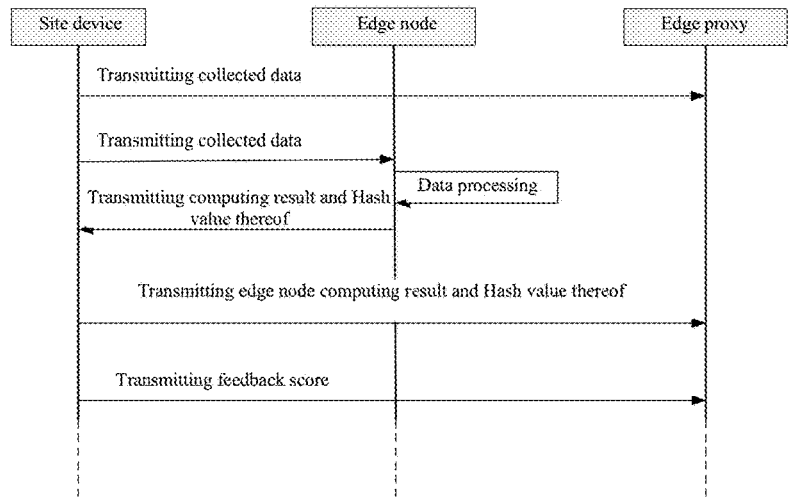
FIG. 6 is a flow chart showing a first case of evidence collection during trust update.
Figure 7:
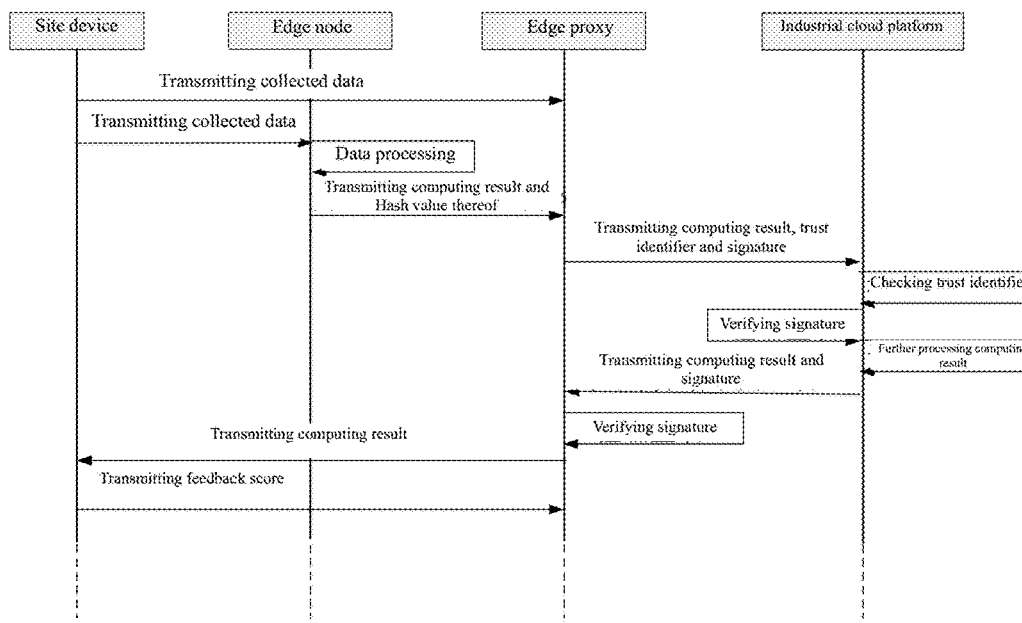
FIG. 7 is a flow chart showing a second case of evidence collection during trust update.

After a network operates for $\Delta T$ time, the edge proxy initiates an update trust request to the site device, the edge proxy starts to collect the collected data of the site device, a computing result of the edge node and a Hash value thereof, and a feedback score from the site device, records response time and a historical direct trust value of the edge node. After the edge proxy initiates the trust update request, the edge proxy conducts each evidence collection in following two cases:

case 1: the edge node directly returns the computing result to the site device, and the site device transmits the computing result of the edge node and the Hash value thereof to the edge proxy; as shown in FIG. 6; and case 2: after preliminary computing, the edge node transmits the computing result and the Hash value thereof to the edge proxy, the edge proxy collects evidence and uploads the computing result of the edge node, trust identifier and signature to an industrial cloud, the industrial cloud checks the trust identifier of the edge node and verifies the signature and then further processes a preliminary computing result of the edge node, the industrial cloud transmits the computing result and the signature to the edge proxy, the edge proxy verifies the signature and then transmits the computing result to the site device, as shown in FIG. 7.

The edge proxy collects evidence data in the above two cases, and collects l evidence data as one evidence collection; each round of trust update requires evidence collection for $CN_\tau$ times, and the edge node is in an operating state at this moment; the edge proxy records the number of times of evidence collection with $\varepsilon(\varepsilon=1, 2, \ldots, CN_T)$; during the $\tau^{th}$ round of trust update, the edge proxy collects evidence for $CN_\tau$ times and then conducts evidence processing and trust update operations; a time interval between every two rounds of trust update is $\Delta T$; a computing formula of the number of times of evidence collection $CN_\tau$ required for the $\tau^{th}$ round of trust update is specified as follows:

$$CN_\tau=[6\times\arctan[0.5\times TI_{Ai\text{-}(\tau-1)}]] \quad (6)$$

The edge proxy computes the number of times of evidence collection $CN_\tau$ required for the $\tau^{th}$ round of trust update according to the trust identifier of the $(\tau-1)^{th}$ time; the edge proxy rapidly updates the trust value of the edge node when the trust identifier is small and the number of times of evidence collection is less; at the initial stage of network operation, the number of times of evidence collection increases with the increase of the number of trustworthy times, in order to update the trust value in time and reduce trust computing amount, the number of times of evidence collection cannot be infinitely increased, and the maximum value of the number of times of evidence collection $$CN_\tau \text{ is } \left\lceil 6\times \frac{\pi}{2} \right\rceil = 10.$$

1) Direct Trust Factor Collection

The site device transmits the collected data $\alpha_{\vartheta\text{-}\tau}^{\varepsilon}$ to the edge proxy and the edge node Ai simultaneity, the site device transmits a piece of data every $\Delta t$, and the edge proxy and the edge node start processing after receiving the second collected data; the edge proxy processes a computing result of the data collected in two consecutive times as $b_{\vartheta\text{-}\tau}^{\varepsilon}$, the edge node Ai processes a computing result of the data collected in two consecutive times as $c_{\vartheta\text{-}\tau}^{\varepsilon}$, $\vartheta$ represents a serial number of evidence collected in each evidence collection, ($\vartheta=1, 2, \ldots, l$); during each evidence collection, the site device needs to transmit (l+1) data, and the data transmitted by the site device form a set $Data_{D\text{-}\tau}^{c\text{-}\vartheta}=\{a_{0\text{-}\tau}^{\varepsilon}, a_{1\text{-}\tau}^{\varepsilon}, a_{2\text{-}\tau}^{\varepsilon}, \ldots, a_{l\text{-}\tau}^{\varepsilon}\}$.

Figure 8:
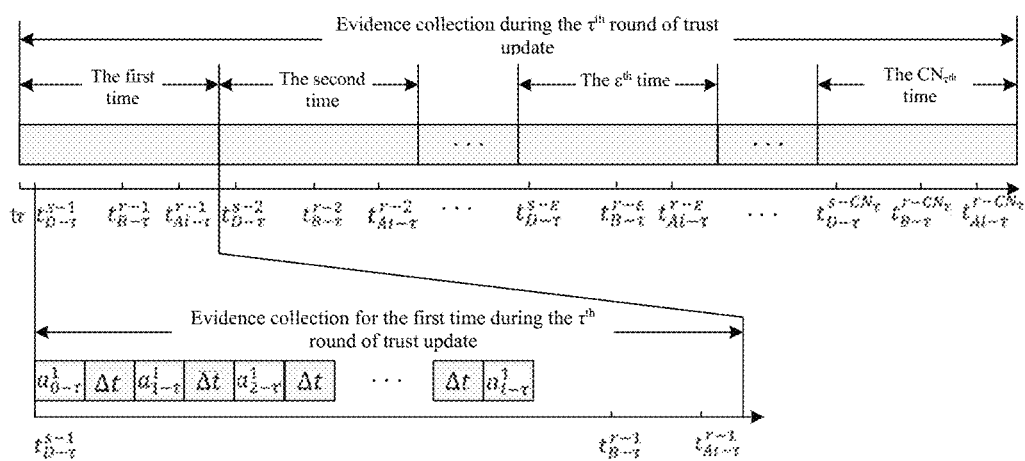
FIG. 8 is a sequence diagram showing a process of evidence collection in the $\tau^{th}$ round of trust update.

At $t_T$, the edge proxy starts the $\tau^{th}$ round of trust update, the edge proxy collects evidence for $CN_\tau$ times in total, l data evidence collected for the $\varepsilon^{th}$ time including a computing result $Data_{B\text{-}\tau}^{r\text{-}\varepsilon}=\{b_{1\text{-}\tau}^{\varepsilon}, b_{2\text{-}\tau}^{\varepsilon}, \ldots, b_{\vartheta\text{-}\tau}^{\varepsilon}, \ldots, b_{l\text{-}\tau}^{\varepsilon}\}$ of the edge proxy, a computing result $Data_{Ai\text{-}\tau}^{r\text{-}\varepsilon}=\{c_{1\text{-}\tau}^{\varepsilon}, c_{2\text{-}\tau}^{\varepsilon}, \ldots, c_{\vartheta\text{-}\tau}^{\varepsilon}, \ldots, c_{l\text{-}\tau}^{\varepsilon}\}$ of the edge node Ai and a Hash value $\text{Data}_{Ai\text{-}\tau}^{h\text{-}\varepsilon} = \{h_{1\text{-}\tau}^{\varepsilon}, h_{2\text{-}\tau}^{\varepsilon}, \ldots, h_{\vartheta\text{-}\tau}^{\varepsilon}, \ldots, h_{l\text{-}\tau}^{\varepsilon}\}$ thereof, and a corresponding Hash value $\text{Data}_{Ai\text{-}\tau}^{h'\text{-}\varepsilon} = \{h_{1\text{-}\tau}^{\varepsilon'}, h_{2\text{-}\tau}^{\varepsilon'}, \ldots, h_{\vartheta\text{-}\tau}^{\varepsilon'}, \ldots, h_{l\text{-}\tau}^{\varepsilon'}\}$ computed by the edge proxy according to the computing result set $\text{Data}_{Ai\text{-}\tau}^{h'\text{-}\varepsilon}$ of the edge node Ai; the edge proxy records time $t_{D\text{-}\tau}^{s\text{-}\varepsilon}$ of transmitting the first data by the site device when collecting evidence for the $\varepsilon^{th}$ time, time $t_{B\text{-}\tau}^{r\text{-}\varepsilon}$ computing the $l^{th}$ result by the edge proxy, and time $t_{Ai\text{-}\tau}^{r\text{-}\varepsilon}$ computing the $l^{th}$ result by the edge node Ai. FIG. 8 shows a process of evidence collection in the $\tau^{th}$ round of trust update.

2) Historical Direct Trust Value Collection

Because trust dynamically changes with time, in order to avoid malicious acts, the edge proxy uses a historical direct trust value to correct a direct trust value, so the direct trust value is more accurate. Therefore, the edge proxy uses a sliding window to store the historical direct trust value so as to reduce the influence of the old direct trust value on the new direct trust value. Each edge node has a sliding storage window, the larger the window, the more the storage and computing overhead, so a short and small sliding storage window can effectively limit the amount of trust computing and improve the efficiency of trust evaluation.

Figure 9:
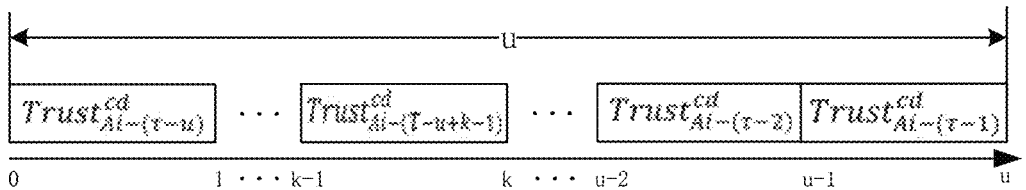
FIG. 9 shows a sliding storage window.

As shown in FIG. 9, the sliding storage window includes u panes, each pane retains a historical direct trust value, that is, a direct trust value before the $\tau^{th}$ round of trust update is stored in the sliding storage window; a direct trust value stored in the k pane is $\text{Trust}_{Ai\text{-}(\tau\text{-}u+k\text{-}1)}^{cd}$; only when each pane has a direct trust value, the window begins to move, and moves one pane every time; a new direct trust value is added into the window after the trust is updated, while an expired direct trust value is extruded out of the window; during the $\tau^{th}$ round of trust update, direct trust values from the $(\tau-u)^{th}$ round of trust update to the $(\tau-1)^{th}$ round of trust update are stored in the window, and a direct trust value of the $\tau^{th}$ round is stored in the sliding storage window after the $\tau^{th}$ round of trust update; when a trust identifier of the edge node Ai is equal to 0, the edge node is regarded as a malicious node, and the edge proxy deletes a sliding storage window thereof.

3) Feedback Score Collection

The edge proxy updates a final trust value of an edge node in an operating state and also needs to take into account a feedback score given to a computing result of the edge node by the site device; a rule of giving scores to edge nodes by the site device is as follows: if a safety accident occurs, the site device feeds back $d_{\vartheta\text{-}\tau}^{\varepsilon} = -1$ regardless whether a trust update is being conducted, and the edge proxy lists an edge node corresponding to the feedback score in a blacklist; otherwise, the site device feeds back scores given to computing results: bad review $d_{\vartheta\text{-}\tau}^{\varepsilon} = 0$ and good review $d_{\vartheta\text{-}\tau}^{\varepsilon} = 1$.

The site device feeds back the scores given to the computing results to the edge proxy, during the $\tau^{th}$ round of trust update, the edge proxy collects for $CN_{\tau}$ times and collects l feedback scores each time, and a feedback score collected by the edge proxy for the $\varepsilon^{th}$ time is $\text{Data}_{Ai\text{-}\tau}^{f\text{-}\varepsilon} = \{d_{1\text{-}\tau}^{\varepsilon}, d_{2\text{-}\tau}^{\varepsilon}, \ldots, d_{\vartheta\text{-}\tau}^{\varepsilon}, \ldots, d_{l\text{-}\tau}^{\varepsilon}\}$ including scores given, by the site device, to computing results directly returned by v edge nodes to the site device and scores given, by the site device, to computing results transmitted by (l–v) edge nodes to the industrial cloud for processing and then returned to the site device; a proxy signature based on elliptic curve is used to make the communication between the edge nodes and the industrial cloud trustworthy, no matter the computing results received by the site device come from the edge nodes or the industrial cloud, the objects to which the site device feeds back scores are edge nodes.

2 Evidence Processing

1) Direct Trust Factor Processing

After collecting evidence for $CN_{\tau}$ times, the edge proxy respectively computes accuracy, integrity and timeliness of an edge node Ai during each evidence collection in the $\tau$ round of trust update;

(a) the edge proxy computes accuracy of the edge node Ai according to formula (1);

(b) the edge proxy computes integrity of the edge node Ai according to formula (2);

(c) according to the time $t_{D\text{-}\tau}^{s\text{-}\varepsilon}$ of transmitting the first data by the site device when collecting evidence for the $\varepsilon^{th}$ time, the time $t_{B\text{-}\tau}^{r\text{-}\varepsilon}$ of computing the $l^{th}$ result by the edge proxy, and the time $t_{Ai\text{-}\tau}^{r\text{-}\varepsilon}$ computing the $l^{th}$ result by the edge node Ai, the edge proxy computes a computing efficiency $$T_{Ai\text{-}\tau}^{tm\text{-}\varepsilon} = \frac{t_{Ai\text{-}\tau}^{r\text{-}\varepsilon} - t_{D\text{-}\tau}^{s\text{-}\varepsilon}}{l}$$

of the edge node and a computing efficiency $$T_{B\text{-}\tau}^{tm\text{-}\varepsilon} = \frac{t_{B\text{-}\tau}^{r\text{-}\varepsilon} - t_{D\text{-}\tau}^{s\text{-}\varepsilon}}{l}$$

of the edge proxy, substitutes $T_{Ai\text{-}\tau}^{tm\text{-}\varepsilon}$, $T_{B\text{-}\tau}^{tm\text{-}\varepsilon}$, $T_{Ai\text{-}\tau}^{tm\text{-}\varepsilon}$, $T_{B\text{-}\tau}^{tm\text{-}\varepsilon}$ into formula (3), and compute timeliness of the edge node Ai.

When conducting the $\tau^{th}$ round of trust update, the edge proxy processes the collected direct trust factors by means of formula (1), formula (2) and formula (3), to obtain $CN_{\tau}$ values of each of accuracy, integrity and timeliness of an edge node Ai to be examined, as shown in Table 5.

TABLE 5

| | $CN_{\tau}$ Direct Trust Factors of Edge Node Ai | | |
|---|---|---|---|
| | Accuracy | Integrity | Timeliness |
| The first time | $E_{Ai\text{-}\tau}^{ac\text{-}1}$ | $E_{Ai\text{-}\tau}^{cm\text{-}1}$ | $E_{Ai\text{-}\tau}^{tm\text{-}1}$ |
| The second time | $E_{Ai\text{-}\tau}^{ac\text{-}2}$ | $E_{Ai\text{-}\tau}^{cm\text{-}2}$ | $E_{Ai\text{-}\tau}^{tm\text{-}2}$ |
| . | . | . | . |
| . | . | . | . |
| . | . | . | . |
| The $\varepsilon$ time | $E_{Ai\text{-}\tau}^{ac\text{-}\varepsilon}$ | $E_{Ai\text{-}\tau}^{cm\text{-}\varepsilon}$ | $E_{Ai\text{-}\tau}^{tm\text{-}\varepsilon}$ |
| . | . | . | . |
| . | . | . | . |
| . | . | . | . |
| The $CN_{\tau}$ time | $E_{Ai\text{-}\tau}^{ac\text{-}CN\tau}$ | $E_{Ai\text{-}\tau}^{cm\text{-}CN\tau}$ | $E_{Ai\text{-}\tau}^{tm\text{-}CN\tau}$ |

2) Historical Trust Value Processing

Because the latest trust value has more influence than the previous trust value, for weight factors of historical direct trust values at different time, there is a need to take into account a time factor, that is, the longer the time of the trust value, the lower the proportion. A weight of the $k^{th}$ pane of the sliding storage window is:

$$\varphi_k = e^{-\rho(u-k)} \tag{7}$$

where $\rho$ represents an attenuation coefficient which is 0.3; if the sliding storage window is not fully stored, u is the number of actual historical direct trust values;

according to the historical direct trust value and weight thereof in the sliding storage window, the edge proxy computes a weighted average historical trust value $\text{Trust}_{Ai-\tau}^{hd}$ of the edge node Ai in the $\tau^{th}$ round of trust update;

$$\text{Trust}_{Ai-\tau}^{hd} = \frac{\sum_{k=1}^{u} \varphi_k \times \text{Trust}_{Ai-(\tau-u+k-1)}^{cd}}{\sum_{k=1}^{u} \varphi_k} \quad (8)$$

3) Feedback Score Processing

For an edge node with a feedback score of −1, the security administrator replaces the edge node with an edge node to be added, and the edge proxy repeats an initial trust value computing step, to evaluate an initial trust value of the edge node to be added.

According to the feedback score, the edge proxy computes reward and penalty factors of the edge node Ai in the $\tau^{th}$ round of trust update; and according to a difference $\Delta N_{Ai-t}^{\varepsilon} = N_{Ai-\tau}^{g-\varepsilon} - \lfloor l \times (1-ER_{Ai}) \rfloor$ between the total number of times of good review $N_{Ai-\tau}^{g-\varepsilon}$ during evidence collection for the $\varepsilon^{th}$ time and the minimum required number of correct computing results, the edge proxy computes a reward factor $E_{Ai-\tau}^{g-\varepsilon}$ and a penalty factor $E_{Ai-\tau}^{b-\varepsilon}$ corresponding to the evidence collection for the $\varepsilon^{th}$ time, where $N_{Ai-\tau}^{g-\varepsilon} = \Sigma_{\vartheta=1}^{l} d_{\vartheta-\tau}^{\varepsilon}$, $ER_{Ai}$ is the error rate that the edge node is allowed to calculate in an industrial production environment.

If $\Delta N_{Ai-\tau}^{\varepsilon} \geq 0$, the reward factor and penalty factor corresponding to the evidence collection for the $\varepsilon^{th}$ time are $E_{Ai-\tau}^{g-\varepsilon}=0.3[(1+e^{-\Delta N_{Ai-\tau}^{\varepsilon}})^{-1}-0.5]$ and $E_{Ai-\tau}^{b-\varepsilon}=0$ respectively; otherwise, the reward factor and penalty factor corresponding to the evidence collection for the $\varepsilon^{th}$ time are $E_{Ai-\tau}^{g-\varepsilon}=0$ and $E_{Ai-\tau}^{b-\varepsilon}=0.4[(1+e^{-\Delta N_{Ai-\tau}^{\varepsilon}})^{-1}-0.5]$ respectively; the reward degree is small and the penalty degree is large, which reflects the characteristic that the trust value is slowly increased and quickly decreased.

The edge proxy computes a final reward or penalty factor $E_{Ai-\tau}^{f}$ according to the reward and penalty factors in the $\tau^{th}$ round of trust update:

$$E_{Ai-\tau}^{f} = \begin{cases} 0, & \exists d_{\vartheta-\tau}^{\varepsilon} = -1 \\ \frac{\sum_{\varepsilon=1}^{CN_\tau} \left[E_{Ai-\tau}^{g-\varepsilon} + E_{Ai-\tau}^{b-\varepsilon}\right]}{CN_\tau}, & \forall d_{\vartheta-\tau}^{\varepsilon} \neq -1 \end{cases} \quad (9)$$

Good feedback from the field device increases the trust value of the edge node Ai and bad feedback rapidly decreases the trust value of the edge node Ai; if there is safety accident feedback from the site device, $E_{Ai-\tau}^{f}$ appears as a penalty factor, $E_{Ai-\tau}^{f}=0$; if there is no safety accident feedback, $E_{Ai-\tau}^{f}>0$ represents reward, $E_{Ai-\tau}^{f}<0$ represents penalty, and $E_{Ai-\tau}^{f}=0$ represents neither reward nor penalty.

3 Trust Update

According to the direct trust value, historical trust value and feedback scores, the edge proxy updates the trust value of the edge node, the edge node is in a to-be-examined state at this moment. Since an insider attack occurs at a given time, a trust evaluation mechanism does not require too frequent trust updates, moreover, frequent trust updates take up more transmission and computing resources. A time interval between every two rounds of trust update is $\Delta T$.

1) Computing Direct Trust Value

The edge proxy repeats the step of computing a direct trust value when evaluating initial trust, and computes a direct trust value $\text{Trust}_{Ai-\tau}^{cd}$ the edge node Ai to be examined of which the judgment result is trustworthy or uncertain in the $\tau^{th}$ round of trust update by means of formula (4); for an edge node to be examined of which the judgment result is untrustworthy, the edge proxy directly lists the edge node in a blacklist.

2) Correcting Direct Trust Value

Before computing the final trust value, the edge proxy needs to correct the direct trust value by using the weighted average historical direct trust value; the edge proxy weights and aggregates $\text{Trust}_{Ai-\tau}^{cd}$ and $\text{Trust}_{Ai-\tau}^{hd}$ of the edge node Ai to obtain a corrected direct trust value $\text{Trust}_{Ai-\tau}^{d}$ the edge node Ai in the $\tau^{th}$ round of trust update:

$$\text{Trust}_{Ai-\tau}^{d} = \delta \times \text{Trust}_{Ai-\tau}^{cd} + (1-\delta) \times \text{Trust}_{Ai-\tau}^{hd} \quad (10)$$

where $\delta$ is used to balance proportions of current trust and historical trust, and $\delta$ is defined as follows:

$$\delta = \begin{cases} \delta_1, & \text{Trust}_{Ai-\tau}^{cd} \geq \text{Trust}_{Ai-\tau}^{hd} \\ \delta_2, & \text{Trust}_{Ai-\tau}^{cd} < \text{Trust}_{Ai-\tau}^{hd} \end{cases} \quad (11)$$

where $0<\delta_1<\delta_2<1$, it is specified that $\delta_1=0.3$, $\delta_2=0.7$, the value of $\delta_1$ is small, to prevent the edge node from accumulating trust thereof quickly, and the value of $\delta_2$ is large, which reflects a penalty for a malicious act of the edge node.

3) Updating Final Trust Value

According to the reward or penalty factor computed in formula (9), the edge proxy computes a final trust value of an edge node to be examined.

A computing formula of the final trust value $\text{Trust}_{Ai-\tau}^{u}$ of the edge node Ai in the $\tau^{th}$ round of trust update is as follows:

$$\text{Trust}_{Ai-\tau}^{u} = \begin{cases} E_{Ai-\tau}^{f} \times \text{Trust}_{Ai-\tau}^{d}, & \exists d_{\vartheta-\tau}^{\varepsilon} = -1 \\ E_{Ai-\tau}^{f} + \text{Trust}_{Ai-\tau}^{d}, & \forall d_{\vartheta-\tau}^{\varepsilon} \neq -1 \end{cases} \quad (12)$$

If a certain feedback score is −1, the final trust value of the edge node Ai in the $\tau^{th}$ round of trust update is equal to 0; otherwise, the final trust value of the edge node Ai in the $\tau^{th}$ round of trust update is equal to a corrected direct trust value of the edge node Ai plus a reward or penalty factor.

4) Computing Trust Identifier

After trust update, the edge proxy compares the final trust value of the edge node to be examined with a trust threshold (trust critical value) in Table 2-trust level table, and then computes a trust identifier of the edge node Ai according to the judgment result and the final trust value, rules are as follows:

(a) for an edge node of which the trust value level is a trustworthy level, the edge proxy computes a trust identifier $TI_{Ai-\tau}$ thereof according to formula (13), computes valid time $T_{Ai-\tau}^{v}$ the trust identifier according to formula (14), and then stores trust associated information thereof locally according to a data structure in Table 6;

a specific computing formula of the trust identifier of the edge node Ai in the $\tau^{th}$ round of trust update is as follows:

$$TI_{Ai-\tau} = \begin{cases} 0, & \text{Trust}_{Ai-\tau}^{d} < \beta_u \\ TI_{Ai-(\tau-1)}, & \beta_u \leq \text{Trust}_{Ai-\tau}^{d} < \beta_c \\ TI_{Ai-(\tau-1)} + 1, & \text{Trust}_{Ai-\tau}^{d} \geq \beta_c \end{cases} \quad (13)$$

a computing formula of the valid time $T_{Ai-\tau}^{v}$ of the trust identifier of the trust value is as follows:

$$T_{Ai-\tau}^{v}=6\times CN_{\tau}\times l\times(\overline{T_{Ai-\tau}}+\Delta t)+TI_{Ai-\tau}\times\Delta T \quad (14)$$

where $CN_{\tau}$ represents a number of times of evidence collection required in the $\tau^{th}$ round of trust update, l represents a data amount of evidence collection each time, $\overline{T_{Ai-\tau}}$ represents an average computing efficiency $$\overline{T_{Ai-\tau}} = \frac{\sum_{\varepsilon=1}^{CN_{\tau}} T_{Ai-\tau}^{tm-\varepsilon}}{CN_{\tau}}$$

of edge nodes Ai, $\Delta t$ represents a time interval at which the site device transmits data, $\Delta T$ represents a time interval between trust updates, and the valid time is in second; if a trust identifier of an edge node is expired, the edge proxy lists the edge node in a blacklist.

TABLE 6

Trust Associated Data of Edge Node Ai

| Time | Node identity identifier | Accuracy membership degree mean | Integrity membership degree mean | Timeliness membership degree mean | Corrected direct trust value | Reward and penalty | Final trust value | Trust identifier | Valid time |
|---|---|---|---|---|---|---|---|---|---|
| $t_\tau$ | $ID_{Ai}$ | $\overline{\mu_{1-\tau}}$ | $\overline{\mu_{2-\tau}}$ | $\overline{\mu_{3-\tau}}$ | $Trust_{Ai-\tau}^{d}$ | $E_{Ai-\tau}^{f}$ | $Trust_{Ai-\tau}^{u}$ | $TI_{Ai-\tau}$ | $T_{Ai-\tau}^{v}$ |

(b) For an edge node of which the trust level is an uncertain level, a trust identifier thereof is unchanged; the edge proxy checks the trust identifier thereof, and if the number of times of continuous equality of the trust identifier is less than 3, the edge proxy allows the edge node to operate; otherwise, the edge proxy lists the edge node in a blacklist, and then the edge node is in an isolation state.

(c) For an edge node of which the trust level is an untrustworthy level, the edge proxy lists the edge node in a blacklist directly, and then the edge node is in an isolation state; the edge proxy broadcasts identity information about the edge node in the blacklist and a trust identifier 0 thereof, and reports to the security administrator to replace the edge node; after the security administrator replaces the isolated edge node with an edge node to be added, the edge proxy repeats an initial trust value computing step, to evaluate an initial trust value of the edge node to be added.

The edge proxy transmits the trust identifier to the site device, the site device decides whether to transmit data according to the trust identifier of the edge node, and transmits data to an edge node with a trust identifier greater than 0 rather than to an edge node with a trust identifier equal to 0.

After $\Delta T$ time, the edge proxy repeatedly executes the steps of evidence collection, evidence processing and trust update, and so on, as shown in FIG. 3.

1.2 Example

Before the network operates, this solution sets parameters, as shown in Table 7.

TABLE 7

| Parameter Values | |
|---|---|
| Data amount l in evidence collection each time | 10 |
| Time interval $\Delta t$ at which site device transmits data | 1 |
| Average computing time $\overline{T_{Ai-\tau}}$ of edge nodes Ai | 0.01 |
| Number u of panes of sliding storage window | 10 |
| Time interval $\Delta T$ between trust updates | 10 |

As shown in FIG. 1, for three edge nodes A1, A2, A3 to be added in the industrial network, these three edge nodes respectively transmit their own identity information to the edge proxy for registration. The security administrator sets allowable error rates of these three edge nodes to be 10%, 15% and 20% respectively, and trust thresholds of the edge nodes A1, A2, A3 are shown in Table 8.

TABLE 8

Trust Thresholds of Edge Nodes A1, A2, A3

| Node | Error rate | Trust Description | Trust Value Range |
|---|---|---|---|
| A1 | 10% | Untrustworthy | [0, 0.70) |
|  |  | Uncertain | [0.70, 0.90) |
|  |  | Trustworthy | [0.90, 1] |
| A2 | 15% | Untrustworthy | [0, 0.61) |
|  |  | Uncertain | [0.61, 0.81) |
|  |  | Trustworthy | [0.81, 1] |
| A3 | 20% | Untrustworthy | [0, 0.51) |
|  |  | Uncertain | [0.51, 0.71) |
|  |  | Trustworthy | [0.71, 1] |

Before the network operates, the edge proxy transmits a to-be-computed data set with a data amount of 10 to the edge nodes A1, A2, A3 respectively at $t_A$ for three times. After the edge proxy processes evidence, the judgment results of the edge nodes A1, A2, A3 are shown in Table 9. Initial trust values of the edge nodes A1, A2 and A3, trust identifiers and valid time thereof are shown in Table 10.

TABLE 9

Three Evidence Processing and Judgment Results of Edge Nodes A1, A2, A3

| | A1 | | | A2 | | | A3 | | |
|---|---|---|---|---|---|---|---|---|---|
| | Accuracy membership degree $\mu_{1\text{-}0}^{\varepsilon}$ | Integrity membership degree $\mu_{2\text{-}0}^{\varepsilon}$ | Timeliness membership degree $\mu_{3\text{-}0}^{\varepsilon}$ | Accuracy membership degree $\mu_{1\text{-}0}^{\varepsilon}$ | Integrity membership degree $\mu_{2\text{-}0}^{\varepsilon}$ | Timeliness membership degree $\mu_{3\text{-}0}^{\varepsilon}$ | Accuracy membership degree $\mu_{1\text{-}0}^{\varepsilon}$ | Integrity membership degree $\mu_{2\text{-}0}^{\varepsilon}$ | Timeliness membership degree $\mu_{3\text{-}0}^{\varepsilon}$ |
| The first time | 1 | 1 | 0.91 | 0.90 | 1 | 0.86 | 0.38 | 0.52 | 0.67 |
| The second time | 0.90 | 1 | 0.91 | 0.71 | 0.90 | 0.63 | 0.38 | 0.52 | 0.55 |
| The third time | 1 | 1 | 0.86 | 0.52 | 1 | 0.63 | 0.28 | 0.71 | 0.50 |
| Judgment matrix | \multicolumn{3}{c}{$\begin{bmatrix} 0 & 0 & 1 \\ 0 & 0 & 1 \\ 0 & 0.33 & 0.66 \end{bmatrix}$} | | | $\begin{bmatrix} 0.33 & 0.33 & 0.33 \\ 0 & 0 & 1 \\ 0 & 0.66 & 0.33 \end{bmatrix}$ | | | $\begin{bmatrix} 1 & 0 & 0 \\ 0 & 0.66 & 0.33 \\ 0.33 & 0.66 & 0 \end{bmatrix}$ | |
| Weight $A_0$ | 0.77 | 0.01 | 0.22 | 0.66 | 0.03 | 0.31 | 0.52 | 0.20 | 0.28 |
| Judgment result $Z_{Ai\text{-}0}$ | {0, 0.07, 0.92} Trustworthy | | | {0.21, 0.42, 0.35} Uncertain | | | {0.61, 0.31, 0.06} Untrustworthy | | |

TABLE 10

Initial Trust Associated Information of Edge Nodes A1, A2, A3

| Node identity identifier $ID_{Ai}$ | Accuracy membership degree mean $\overline{\mu_{1\text{-}0}}$ | Integrity membership degree mean $\overline{\mu_{2\text{-}0}}$ | Timeliness membership degree mean $\overline{\mu_{3\text{-}0}}$ | Initial trust value $Trust_{Ai\text{-}0}^{u}$ | Trust identifier $TI_{Ai\text{-}0}$ | Valid time $T_{Ai\text{-}0}^{v}$ |
|---|---|---|---|---|---|---|
| $ID_{A1}$ | 0.96 | 1 | 0.91 | 0.94 (0.80) | 1 | 55 |
| $ID_{A2}$ | 0.71 | 0.96 | 0.63 | 0.75 | 1 | 55 |
| $ID_{A3}$ | — | — | — | — | — | — |

NOTE:
the edge proxy degrades the trust level of A1 to an uncertain level.

The initial trust value of A1 is greater than 0.9, in order to prevent a malicious node from cheating trust, the edge proxy replaces the trust value of A1 with 0.8, and transmits a trust identifier $TI_{A1\text{-}0}=1$ to the site device. The trust level of A2 is an uncertain level, the edge proxy allocates a trust identifier $TI_{A2\text{-}0}=1$ to same, and transmits the trust identifier to the site device. The judgment result of A3 is untrustworthy, then, the edge proxy repeats steps of evidence collection, evidence processing and initial trust evaluation twice. Since the judgment result is untrustworthy, A3 is a malicious or failed edge node, the identity information of A3 and a trust identifier $TI_{A3\text{-}0}=0$ thereof are broadcast, and are reported to the safety administrator for replacement.

The edge proxy evaluates an initial trust value of a replaced edge node A3' to be added, the initial trust value of the edge node A3' is 0.65 which is greater than 0.51, the trust level is an uncertain level, the edge proxy allocates a trust identifier $TI_{A3'\text{-}0}=1$ to the edge node and transmits the trust identifier to the site device, and the site device receives the trust identifier and then transmits data to the edge node.

After the network operates for 10 s, the edge proxy initiates a trust update request to the site device, and the site device transmits the collected data to the edge node and the edge proxy simultaneously. The edge proxy starts the first round of trust update, the evidence of the edge node A1, A2, A3' needs to be collected for three times and the amount of data collected each time is 10. After the first round of trust update for 10 s, a second round of trust update is conducted. After two rounds of trust update, the final trust values of the edge nodes A1, A2, A3' in each round of trust update are shown in Table 11.

TABLE 11

Updated Final Trust Associated Information about A1, A2, A3'

| Time $t_\tau$ | Node identity identifier $ID_{Ai}$ | Number of times of evidence collection $CN_\tau$ | Direct trust value $Trust_{Ai\text{-}\tau}^{cd}$ | Corrected direct trust value $Trust_{Ai\text{-}\tau}^{d}$ | Penalty or reward $E_{Ai\text{-}\tau}^{f}$ | Final trust value $Trust_{Ai\text{-}\tau}^{u}$ | Trust identifier $TI_{Ai\text{-}\tau}$ | Valid time $T_{Ai\text{-}\tau}^{v}$ |
|---|---|---|---|---|---|---|---|---|
| $t_1$ | $ID_{A1}$ | 3 | 0.93 | 0.85 | −0.04 | 0.81 | 1 | 192 |
|  | $ID_{A2}$ | 3 | 0.90 | 0.79 | 0.06 | 0.85 | 2 | 202 |
|  | $ID_{A3'}$ | 3 | 0.85 | 0.71 | 0 | 0.71 | 2 | 202 |
| $t_2$ | $ID_{A1}$ | 5 | 0.84 | 0.84 | 0.01 | 0.85 | 1 (0) | — |
|  | $ID_{A2}$ | 5 | 0.70 | 0.73 | 0.09 | 0.82 | 3 | 333 |
|  | $ID_{A3'}$ | 5 | 0.88 | 0.79 | 0.03 | 0.82 | 3 | 333 |

Because trust identifiers of A1 are equal for three consecutive times, the edge proxy regards A1 as a malicious node; the edge proxy broadcasts identity information about A1 and the trust identifier 0 thereof, and reports to the security administrator for replacement. After the safety administrator replaces A1 with A1', the edge proxy evaluates an initial trust value thereof, and the edge proxy updates final trust values of A2, A3' after evaluating the initial trust value of A1'. Evaluation results when updating to the fourth round are shown in Table 12.

TABLE 12

Updated Final Trust Associated Information about A1, A2, A3'

| Time $t_\tau$ | Node identity identifier $ID_{Ai}$ | Number of times of evidence collection $CN_t$ | Direct trust value $Trust_{Ai\text{-}\tau}^{cd}$ | Corrected direct trust value $Trust_{Ai\text{-}\tau}^{d}$ | Penalty or reward $E_{Ai\text{-}\tau}^{f}$ | Final trust value $Trust_{Ai\text{-}\tau}^{u}$ | Trust identifier $TI_{Ai\text{-}\tau}$ | Valid time $T_{Ai\text{-}\tau}^{v}$ |
|---|---|---|---|---|---|---|---|---|
| $t_2$ | $ID_{A1}$ | 3 | 0.96 | — | — | 0.96 | 1 | 55 |
|  | $ID_{A2}$ | 6 | 0.83 | 0.78 | 0.06 | 0.84 | 4 | 404 |
|  | $ID_{A3'}$ | 6 | 0.81 | 0.83 | −0.04 | 0.79 | 4 | 404 |
| $t_4$ | $ID_{A1}$ | 3 | 0.99 | 0.97 | −0.04 | 0.93 | 2 | 202 |
|  | $ID_{A2}$ | — | — | — | −1 | 0 | 0 | — |
|  | $ID_{A3'}$ | 7 | 0.91 | 0.84 | 0.11 | 0.95 | 5 | 474 |

NOTE:
the computing result of A2 leads to a safety accident in industrial production.

During the fourth round of trust update, a score given by the site device to A2 is −1, so the edge proxy regards A2 as a malicious node. The edge proxy broadcasts identity information about A2 and the trust identifier 0 thereof, and reports to the security administrator for replacement. After the safety administrator replaces A2 with A2', the edge proxy evaluates an initial trust value thereof first. The edge proxy updates final trust values of A1', A3' after evaluating the initial trust value of A2'. Evaluation results in the fifth round of trust update are shown in Table 13.

TABLE 13

Final Trust Associated Information about Edge Nodes A1', A2', A3' after Fifth Round of Trust Update

| Time $t_5$ | Node identity identifier $ID_{Ai}$ | Number of times of evidence collection $CN_5$ | Direct trust value $Trust_{Ai\text{-}5}^{cd}$ | Corrected direct trust value $Trust_{Ai\text{-}5}^{d}$ | Penalty or reward $E_{Ai\text{-}5}^{f}$ | Final trust value $Trust_{Ai\text{-}5}^{u}$ | Trust identifier $TI_{Ai\text{-}5}$ | Valid time $T_{Ai\text{-}5}^{v}$ |
|---|---|---|---|---|---|---|---|---|
| $t_5$ | $ID_{A2'}$ | 3 | 0.91 | — | — | 0.91 | 1 | 55 |
|  | $ID_{A1'}$ | 3 | 0.96 | 0.96 | 0 | 0.96 | 2 | 302 |
|  | $ID_{A3'}$ | 8 | 0.87 | 0.85 | 0.06 | 0.91 | 6 | 545 |

When trust update is conducted to the tenth round, the historical direct trust values of A1' stored in the sliding window in the edge proxy are shown in Table 14. After the fifth round of trust update, the direct trust values of A1' are not updated.

TABLE 14

Sliding Storage Window of Edge Node A1'

| 1 | 2 | 3 | 4 | 5 | 6 | 7 | 8 | 9 | 10 |
|---|---|---|---|---|---|---|---|---|----|
| 0.96 | 0.99 | 0.96 | | | | | | | |

At this moment, the historical direct trust values of A2 stored in the sliding window in the edge proxy are shown in Table 15. Weights corresponding to the first to the fifth panes are 0.30, 0.40, 0.54, 0.74, and 1.00 respectively, and a sum of the weights is 2.98. The edge proxy weighted averages the historical direct trust values, obtaining $Trust_{A2'-10}^{hd}=0.88$.

TABLE 15

Sliding Storage Window of Edge Node A2'

| 1 | 2 | 3 | 4 | 5 | 6 | 7 | 8 | 9 | 10 |
|---|---|---|---|---|---|---|---|---|----|
| 0.91 | 0.87 | 0.83 | 0.89 | 0.93 | | | | | |

At this moment, the historical direct trust values of A3' stored in the sliding window in the edge proxy are shown in Table 16. Weights corresponding to all panes are 0.06, 0.09, 0.12, 0.16, 0.22, 0.30, 0.40, 0.54, 0.74 and 1.00 respectively, and a sum of the weights is 3.63. The edge proxy weighted averages the historical direct trust values, obtaining $Trust_{A3'-10}^{hd}=0.87$.

TABLE 16

Sliding Storage Window of Edge Node A3'

| 1 | 2 | 3 | 4 | 5 | 6 | 7 | 8 | 9 | 10 |
|---|---|---|---|---|---|---|---|---|----|
| 0.65 | 0.85 | 0.88 | 0.81 | 0.91 | 0.87 | 0.83 | 0.89 | 0.93 | 0.85 |

Results in the tenth round of trust update are shown in Table 17.

TABLE 17

Final Trust Associated Information about Edge Nodes A1', A2', A3'

| Time | Node identity identifier | Number of times of evidence collection | Direct trust value | Corrected direct trust value | Penalty or reward | Final trust value | Trust identifier | Valid time |
|------|---|---|---|---|---|---|---|---|
| $t_{10}$ | $ID_{Ai}$ | $CN_{10}$ | $Trust_{Ai-10}^{cd}$ | $Trust_{Ai-10}^{d}$ | $E_{Ai-10}^{f}$ | $Trust_{Ai-10}^{u}$ | $TI_{Ai-10}$ | $T_{Ai-10}^{v}$ |
| $t_{10}$ | $ID_{A2'}$ | 8 | 0.91 | 0.88 | 0.06 | 0.94 | 6 | 545 |
| | $ID_{A1'}$ | — | — | — | — | 0.96 | — | 0 |
| | $ID_{A3'}$ | 9 | 0.84 | 0.85 | −0.01 | 0.84 | 11 | 655 |

After the fifth round of trust update, the trust identifier of the edge node A1' is expired, however, the trust value thereof is still not updated, the edge proxy regards A1' as a malicious node or failed node, lists same in a blacklist, broadcasts the identity and trust identifier 0 thereof, and reports to the safety administrator for replacement.

In conclusion, an edge node is a malicious or failed node in following four cases:
(1) a judgment result of the edge node is untrustworthy;
(2) trust identifiers for three consecutive times of the edge node are equal;
(3) a site device feeds back a safety incident; and
(4) the trust identifier of the edge node is expired.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A judgment method for edge node computing result trustworthiness based on trust evaluation, characterized in that the method comprises following steps:

S1 Before Network Operation: each edge node to be added transmits identity information $ID_{Ai}$ to an edge proxy for registration, a security administrator sets an error rate $ER_{Ai}$ of computing errors allowed to be caused by each edge node in an industrial production environment; the edge proxy marks evidence collected for which number of times with $\varepsilon$ ($\varepsilon=1, 2, \ldots, CN_\tau$), and marks trust associated information as a trust value computed in which round with $\tau$ ($\tau \in N$), where $\tau=0$ when an initial trust value is evaluated, $\tau \geq 1$ when a trust value is updated; $CN_\tau$ represents a total number of times of evidence collection required when the edge proxy computes a trust value in a $\tau^{th}$ round, and $t_\tau$ represents time when the edge proxy starts computing the trust value in the $\tau^{th}$ round; and after verifying an identity of an edge node, the edge proxy starts evaluating an initial trust value of the edge node;

S11 Evidence Collection: the edge proxy starts evaluating the initial trust value of the edge node at $t_0$, the edge proxy randomly generates a to-be-computed data set $Data_{B-0}^{c-\varepsilon}=\{a_{0-0}^{\varepsilon}, a_{1-0}^{\varepsilon}, a_{2-0}^{\varepsilon}, \ldots, a_{l-0}^{\varepsilon}\}$, and generates a result set $Data_{B-0}^{r-\varepsilon}=\{b_{1-0}^{\varepsilon}, b_{2-0}^{\varepsilon}, b_{3-0}^{\varepsilon}, \ldots, b_{l-0}^{\varepsilon}\}$ after adjacent data are pairwise computed as a reference set, wherein this solution specifies that the number of times of evidence collection $CN_0$ required for initial trust value evaluation is 3;

the edge proxy transmits a to-be-computed set to the edge node, the edge node computes and then transmits a computing result set $Data_{Ai\text{-}0}^{r\text{-}\varepsilon}=\{c_{1\text{-}0}^{\varepsilon}, c_{2\text{-}0}^{\varepsilon}, c_{3\text{-}0}^{\varepsilon}, \ldots, c_{l\text{-}0}^{\varepsilon}\}$ and a computing result Hash value set $Data_{Ai\text{-}0}^{r\text{-}\varepsilon}=\{h_{1\text{-}0}^{\varepsilon}, h_{2\text{-}0}^{\varepsilon}, h_{3\text{-}0}^{\varepsilon}, \ldots, h_{l\text{-}0}^{\varepsilon}\}$ to the edge proxy;

according to the computing result set $Data_{Ai\text{-}0}^{r\text{-}\varepsilon}$ from the edge node, the edge proxy computes a Hash value $Data_{Ai\text{-}0}^{h'\text{-}\varepsilon}=\{h_{1\text{-}0}^{\varepsilon'}, h_{2\text{-}0}^{\varepsilon'}, h_{3\text{-}0}^{\varepsilon'}, \ldots, h_{l\text{-}0}^{\varepsilon'}\}$ corresponding thereto;

the edge proxy records time $t_{B\text{-}0}^{s\text{-}\varepsilon}$ when the to-be-collected set is transmitted for the $\varepsilon$ time, time $t_{B\text{-}0}^{r\text{-}\varepsilon}$ when computing is completed, and time $t_{Ai\text{-}0}^{r\text{-}\varepsilon}$ when a computing result of an edge node Ai is received, where i represents a number of nodes, i=1, 2, . . . , n;

S12 Evidence Processing: the edge proxy processes collected data as follows:

(S12-1) accuracy represents a proportion of the number of correct computing results to the number of total data; an accuracy computing formula of evidence collection for the $\varepsilon^{th}$ time is as follows:

$$E_{Ai\text{-}\tau}^{ac\text{-}\varepsilon} = \frac{N_{Ai\text{-}\tau}^{ac\text{-}\varepsilon}}{l} \quad (1)$$

where $N_{Ai\text{-}\tau}^{ac\text{-}\varepsilon}$ represents identical number in a result set $Data_{B\text{-}\tau}^{r\text{-}\varepsilon}$ computed by the edge proxy in evidence collection for the $\varepsilon^{th}$ time and a result set $Data_{Ai\text{-}\tau}^{r\text{-}\varepsilon}$ computed by the edge node Ai, $\varepsilon$ represents evidence collected for the $\varepsilon^{th}$ time, $\tau$ represents trust computing in the $\tau^{th}$ round, and l represents a data amount in evidence collection each time;

(S12-2) integrity represents a proportion of the number of complete data to the number of total data; an integrity computing formula of evidence collection for the $\vartheta^{th}$ time is as follows:

$$E_{Ai\text{-}\tau}^{cm\text{-}\varepsilon} = \frac{N_{Ai\text{-}\tau}^{cm\text{-}\varepsilon}}{l} \quad (2)$$

where $N_{Ai\text{-}\tau}^{cm\text{-}\varepsilon}$ represents identical number in a result Hash value set $Data_{Ai\text{-}\varepsilon}^{h'\text{-}\varepsilon}$ computed by the edge proxy in evidence collection for the $\varepsilon^{th}$ time and a result Hash value set $Data_{Ai\text{-}\tau}^{h\text{-}\varepsilon}$ computed by the edge node Ai, $\varepsilon$ represents evidence collected for the $\varepsilon^{th}$ time, $\tau$ represents trust computing in the $\tau^{th}$ round, and l represents a data amount in evidence collection each time;

(S12-3) timeliness represents a difference between a computing efficiency of the edge node Ai and a computing efficiency of the edge proxy; a timeliness computing formula of evidence collection for the $\varepsilon^{th}$ time is as follows:

$$E_{Ai\text{-}\tau}^{tm\text{-}\varepsilon}=T_{Ai\text{-}\tau}^{tm\text{-}\varepsilon}-T_{B\text{-}\tau}^{tm\text{-}\varepsilon} \quad (3)$$

where $T_{Ai\text{-}\tau}^{tm\text{-}\varepsilon}$ represents a computing efficiency of the edge node in evidence collection for the $\varepsilon^{th}$ time; $T_{B\text{-}\tau}^{tm\text{-}\varepsilon}$ represents a computing efficiency of the edge proxy in evidence collection for the $\varepsilon^{th}$ time, and $\tau$ represents trust computing in the $\tau^{th}$ round;

when the edge proxy evaluates the initial trust value, the edge proxy computes a computing efficiency $$T_{Ai\text{-}0}^{tm\text{-}\varepsilon} = \frac{t_{Ai\text{-}0}^{r\text{-}\varepsilon} - t_{B\text{-}0}^{s\text{-}\varepsilon}}{l}$$

of $CN_0$ edge nodes and a computing efficiency $$T_{B\text{-}0}^{tm\text{-}\varepsilon} = \frac{t_{B\text{-}0}^{r\text{-}\varepsilon} - t_{B\text{-}0}^{s\text{-}\varepsilon}}{l}$$

of the edge proxy according to the time $t_{B\text{-}0}^{s\text{-}\varepsilon}$ when the to-be-collected set is transmitted for $\varepsilon^{th}$ time, the time $t_{B\text{-}0}^{r\text{-}\varepsilon}$ when computing of the to-be-computed set is completed, and the time $t_{Ai\text{-}0}^{r\text{-}\varepsilon}$ when a computing result of an edge node Ai is received, substitutes the results into formula (3), and computes to obtain timeliness of the $CN_0$ edge nodes Ai;

when evaluating the initial trust value, the edge proxy processes evidence collected for three times by means of formula (1), formula (2) and formula (3), to obtain three values of each of accuracy, integrity and timeliness of the edge nodes Ai to be added;

S13 Initial Trust Evaluation:

(S13-1) Computing Initial Trust Value:

a direct trust value is a quantization value that indicates an ability of the edge node to complete a request task and is based on an interactive record history between the edge proxy and the edge node; when the edge proxy computes the initial trust value of the edge node, the edge node is in a to-be-operated state; the edge proxy conducts fuzzy evaluation on direct trust factors of edge nodes to be operated respectively, steps of computing direct trust values are as follow:

(S13-1-a) determining a factor set $E=\{E_{Ai\text{-}\tau}^{ac\text{-}\varepsilon}, E_{Ai\text{-}\tau}^{cm\text{-}\varepsilon}, E_{Ai\text{-}\tau}^{tm\text{-}\varepsilon}\}$, and an evaluation set $V=\{V_1, V_2, V_3\}$, where $V_1$ represents untrustworthiness, $V_2$ represents uncertainty, and $V_3$ represents trustworthiness; it is stipulated that $\mu^{un}$ is an untrustworthy membership degree, and $0 \leq \mu^{un} < \beta_u$; $\mu^{in}$ is an uncertain membership degree, and $\beta_u \leq \mu^{in} < \beta_c$; $\mu^{cr}$ is a trustworthy membership degree, and $\beta_c \leq \mu^{cr} \leq 1$, where $\beta_u$ is untrustworthy threshold and $\beta_c$ is trustworthy threshold; the edge proxy computes membership degrees of accuracy, integrity and timeliness, computing formulae are as follows:

S13-1-a-① computing formula of membership degree of accuracy in evidence collection for the $\varepsilon^{th}$ time is as follows:

$$\mu_{1\text{-}\tau}^{\varepsilon} = \begin{cases} 0, & E_{Ai\text{-}\tau}^{ac\text{-}\varepsilon} = 0 \\ [1+10(1-E_{Ai\text{-}\tau}^{ac\text{-}\varepsilon})^2]^{-1}, & 0 < E_{Ai\text{-}\tau}^{ac\text{-}\varepsilon} \leq 1 \end{cases}$$

S13-1-a-② computing formula of membership degree of integrity in evidence collection for the $\varepsilon^{th}$ time is as follows:

$$\mu_{2\text{-}\tau}^{\varepsilon} = \begin{cases} 0, & E_{Ai\text{-}\tau}^{cm\text{-}\varepsilon} = 0 \\ [1+10(1-E_{Ai\text{-}\tau}^{cm\text{-}\varepsilon})^2]^{-1}, & 0 < E_{Ai\text{-}\tau}^{cm\text{-}\varepsilon} \leq 1 \end{cases}$$

S13-1-a-③ computing formula of membership degree of timeliness in evidence collection for the $\varepsilon^{th}$ time is $$\mu_{3\text{-}\tau}^{\varepsilon} = [1+\gamma \times (E_{Ai\text{-}\tau}^{tm\text{-}\varepsilon})^2]^{-1},$$

where $\gamma = \dfrac{CPU \text{ clock speed of edge proxy}}{CPU \text{ clock speed of edge node}}$;

(S13-1-b) computing proportions of membership degrees corresponding to accuracy, integrity and timeliness in trust computing in the $\tau^{th}$ round belonging to $V_1$, $V_2$, $V_3$, which are $\{r_{11-\tau}, r_{12-\tau}, r_{13-\tau}\}$, $\{r_{21-\tau}, r_{22-\tau}, r_{23-\tau}\}$ and $\{r_{31-\tau}, r_{32-\tau}, r_{33-\tau}\}$ respectively, for example, $$r_{11-\tau} = \frac{N(\mu_{1-\tau}^{un-\varepsilon})}{CN_\tau},$$

where $N(\mu_{1-\tau}^{un-\varepsilon})$ represents the number of accuracy membership degrees of $CN_\tau$ accuracy membership degrees within an untrustworthy membership degree range; the edge proxy obtains a judgment matrix $$R_\tau = \begin{bmatrix} r_{11-\tau} & r_{12-\tau} & r_{13-\tau} \\ r_{21-\tau} & r_{22-\tau} & r_{23-\tau} \\ r_{31-\tau} & r_{32-\tau} & r_{33-\tau} \end{bmatrix};$$

(S13-1-c) computing weight corresponding to accuracy, integrity and timeliness using the entropy weight method, the computing steps being as follows:

S13-1-c-① forming a matrix by $CN_\tau$ membership degrees $\mu_{1-\tau}^\varepsilon$, $\mu_{2-\tau}^\varepsilon$, $\mu_{3-\tau}^\varepsilon$ corresponding to accuracy, integrity and timeliness:

$$\begin{bmatrix} \mu_{1-\tau}^1 & \cdots & \mu_{1-\tau}^\varepsilon & \cdots & \mu_{1-\tau}^{CN_\tau} \\ \mu_{2-\tau}^1 & \cdots & \mu_{2-\tau}^\varepsilon & \cdots & \mu_{2-\tau}^{CN_\tau} \\ \mu_{3-\tau}^1 & \cdots & \mu_{3-\tau}^\varepsilon & \cdots & \mu_{3-\tau}^{CN_\tau} \end{bmatrix};$$

S13-1-c-② computing information entropy corresponding to accuracy, integrity and timeliness:

$$E_{j-\tau} = -(\ln CN_\tau)^{-1} \sum_{\varepsilon=1}^{CN_\tau} (p_{j-\tau}^\varepsilon) \ln(p_{j-\tau}^\varepsilon),$$

where $p_{j-\tau}^\varepsilon = \frac{\mu_{j-\tau}^\varepsilon}{\sum_{\varepsilon=1}^{CN_\tau} \mu_{j-\tau}^\varepsilon}$, $(j = 1, 2, 3)$;

S13-1-c-③ computing weight corresponding to accuracy, integrity and timeliness:

$$\alpha_{j-\tau} = \frac{1 - E_{j-\tau}}{3 - \sum_{j=1}^{3} E_{j-\tau}},$$

in order to avoid the condition where the weight is zero when the degree of dispersion of a certain factor is too small, weight ranges corresponding to accuracy, integrity and timeliness are $\alpha_1 \in [0.5, 0.8]$, $\alpha_2 \in [0.01, 0.2]$ and $\alpha_3 \in [0.2, 0.4]$ respectively, where $\alpha_1 > \alpha_3 > \alpha_2$; when the weight obtained using the entropy weight method is not within the specified range, the maximum or minimum value of the corresponding range is taken, actual weight is $$\alpha'_{j-\tau} = \frac{\alpha_{j-\tau}}{\alpha_{1-\tau} + \alpha_{2-\tau} + \alpha_{3-\tau}}, A_\tau = \{\alpha'_{1-\tau}, \alpha'_{2-\tau}, \alpha'_{3-\tau}\};$$

(S13-1-d) computing a judgment result $Z_{Ai-\tau} = A_\tau * R_\tau = \{z_{1-\tau}, z_{2-\tau}, z_{3-\tau}\}$, there being following three cases:

S13-1-d-① when $z_{1-\tau}$ is the maximum, the edge node Ai is untrustworthy, the edge proxy does not compute an average membership degree of accuracy, integrity and timeliness;

S13-1-d-② when $z_{2-\tau}$ is the maximum, the edge node Ai is uncertain in trust, the edge proxy computes means of membership degrees within a range $[\beta_u, \beta_c)$ corresponding to accuracy, integrity and timeliness, which are $$\overline{\mu_{1-\tau}} = \frac{\sum_{\varepsilon=1}^{CN_\tau} \mu_{1-\tau}^{in-\varepsilon}}{N(\mu_{1-\tau}^{in-\varepsilon})}, \overline{\mu_{2-\tau}} = \frac{\sum_{\varepsilon=1}^{CN_\tau} \mu_{2-\tau}^{in-\varepsilon}}{N(\mu_{2-\tau}^{in-\varepsilon})}, \overline{\mu_{3-\tau}} = \frac{\sum_{\varepsilon=1}^{CN_\tau} \mu_{3-\tau}^{in-\varepsilon}}{N(\mu_{3-\tau}^{in-\varepsilon})},$$

where a denominator represents the number of membership degrees of all factors within the range $[\beta_u, \beta_c)$ and a numerator represents the sum of membership degrees of all factors within the range $[\beta_u, \beta_c)$; $\mu_{1-\tau}^{in-\varepsilon}$ is the membership degree of the accuracy of the $\tau^{th}$ evidence collection within the range $[\beta_u, \beta_c)$, $\mu_{2-\tau}^{in-\varepsilon}$ is the membership degree of the integrity of the $\tau^{th}$ evidence collection within the range $[\beta_u, \beta_c)$, $\mu_{2-\tau}^{in-\varepsilon}$ is the membership degree of the timeliness of the $\tau^{th}$ evidence collection within the range $[\beta_u, \beta_c)$;

S13-1-d-③ when $z_{3-\tau}$ is the maximum, the edge node Ai is trustworthy, the edge proxy computes means of membership degrees within a range $[\beta_c, 1]$ corresponding to accuracy, integrity and timeliness, which are $$\overline{\mu_{1-\tau}} = \frac{\sum_{\varepsilon=1}^{CN_\tau} \mu_{1-\tau}^{cr-\varepsilon}}{N(\mu_{1-\tau}^{cr-\varepsilon})}, \overline{\mu_{2-\tau}} = \frac{\sum_{\varepsilon=1}^{CN_\tau} \mu_{2-\tau}^{cr-\varepsilon}}{N(\mu_{2-\tau}^{cr-\varepsilon})}, \overline{\mu_{3-\tau}} = \frac{\sum_{\varepsilon=1}^{CN_\tau} \mu_{3-\tau}^{cr-\varepsilon}}{N(\mu_{3-\tau}^{cr-\varepsilon})},$$

where a denominator represents the number of membership degrees of all factors within the range $[\beta_c, 1]$ and a numerator represents the sum of membership degrees of all factors within the range $[\beta_c, 1]$; $\mu_{1-\tau}^{cr-\varepsilon}$ is the membership degree of the accuracy of the $\tau^{th}$ evidence collection within the range $[\beta_c, 1]$, $\mu_{2-\tau}^{cr-\varepsilon}$ is the membership degree of the integrity of the $\tau^{th}$ evidence collection within the range $[_c, 1]$, $\mu_{2-\tau}^{cr-\varepsilon}$ is the membership degree of the timeliness of the $\tau^{th}$ evidence collection within the range $[\beta_c, 1]$;

(S13-1-e) the edge proxy computes a direct trust value $\text{Trust}_{Ai-\tau}^{cd}$ the edge node Ai according to the average membership degree of accuracy, integrity and timeliness, and the weight thereof, the computing formula being as follows:

$$\text{Trust}_{Ai-\tau}^{cd} = \alpha_{1-\tau}^{cd} = \alpha_{1-\tau}' \overline{\mu_{1-\tau}} + \alpha_{2-\tau}' \overline{\mu_{2-T}} + \alpha_{3-\tau}' \overline{\mu_{3-\tau}} \quad (4)$$

since the edge nodes to be operated have no historical trust values and feedback scores, at this moment, the initial direct trust value is the final trust value, and the final trust value before the edge node Ai operates is $\text{Trust}_{Ai-0}^u = \text{Trust}_{Ai-0}^{cd}$;

(S13-2) Computing Trust Identifier: edge node trust is divided into three levels, namely an untrustworthy level, an uncertain level and a trustworthy level;

a threshold of the untrustworthy level is $\beta_u$, a threshold of the trustworthy level is $\beta_c$, $0 < \beta_u < \beta_c \leq 1$ and $\beta_c = [1 + 10(ER_{Ai})^2]^{-1}$, $\beta_u = \beta_c - 0.2$, where $ER_{Ai}$ represents an error rate of computing errors allowed to be caused by each edge node Ai in an industrial production environment occasionally due to mistake, $0 \leq ER_{Ai} < 30\%$, the greater the $\beta_u$ and $\beta_c$, the sensitive the system to incorrect computing results; the security administrator sets an error rate of errors allowed to be caused by each edge node in an industrial production environment, and the edge proxy computes corresponding $\beta_u$ and $\beta_c$ according to the error rate;

the edge proxy computes a trust identifier of an edge node Ai to be operated according to a judgment result, the rules are as follows:

(S13-2-a) for an edge node of which the trust value level is a trustworthy level, in order to prevent a malicious node from cheating trust, the edge proxy replaces a trust value of the edge node with a trustworthy level with $$\frac{\beta_u + \beta_c}{2},$$

that is, degrades the edge node with a trustworthy level to an edge node with an uncertain level;

(S13-2-b) for an edge node of which the trust value level is an uncertain level, the edge proxy allocates a trust identifier $TI_{Ai-0}=1$ of an initial trust value to the edge node, computes valid time $T_{Ai-0}{}^v$ the initial trust identifier according to formula (5), and stores initial trust associated information locally;

a computing formula of the valid time $T_{Ai-0}{}^v$ the trust identifier of the initial trust value is as follows:

$$T_{Ai-0}{}^v = 5i \times CN_0 \times \overline{T_{At-0}} \times l + 5\Delta T \qquad (5)$$

where i represents a number of on-line edge nodes, $CN_0$ represents a number of times of evidence collection in initial trust evaluation, $\overline{T_{At-0}}$ represents an average computing efficiency $$\overline{T_{Ai-0}} = \frac{\sum_{\varepsilon=1}^{CN_0} T_{At-0}^{tm-\varepsilon}}{CN_0}$$

of edge nodes Ai, l represents a data amount of evidence collection each time, $\Delta T$ represents a time interval between trust updates, and the valid time is in second; if a trust identifier of an edge node is expired, the edge proxy lists the edge node in a blacklist;

(S13-2-c) for an edge node of which the trust level is an untrustworthy level, that is, an edge node of which the $z_{1-\tau}$ is the maximum, to avoid evaluation errors, the edge proxy repeats the above-mentioned steps of evidence collection, evidence processing and trust evaluation to evaluate the initial trust value thereof twice, if the trust value is still untrustworthy after being evaluated twice, reports to the security administrator to replace the edge node, and computes an initial trust value of the replaced edge node to be added;

initial trust associated data of the edge node Ai includes initial trust value evaluation start time $t_0$, a node identity identifier $ID_{Ai}$, an accuracy membership degree mean $\overline{\mu_{1-0}}$, an integrity membership degree mean $\overline{\mu_{2-0}}$, a timeliness membership degree mean $\overline{\mu_{2-0}}$, an initial trust value $Trust_{Ai-0}{}^u$, a trust identifier $TI_{Ai-0}$ and valid time $T_{Ai-0}{}^v$;

the edge proxy transmits the trust identifier to a site device, the site device checks the trust identifier of the edge node to be operated and then transmits data to an edge node with a trust identifier greater than 0, and then the edge node is in an operating state;

S2 After Network Operation:

S21 Evidence Collection: after a network operates for $\Delta T$ time, the edge proxy initiates an update trust request to the site device, the edge proxy starts to collect the collected data of the site device, a computing result of the edge node and a Hash value thereof, and a feedback score from the site device, records response time and a historical direct trust value of the edge node; after the edge proxy initiates the trust update request, the edge proxy conducts each evidence collection in following two cases:

case 1: the edge node directly returns the computing result to the site device, and the site device transmits the computing result of the edge node and the Hash value thereof to the edge proxy;

case 2: after preliminary computing, the edge node transmits the computing result and the Hash value thereof to the edge proxy, the edge proxy collects evidence and uploads the computing result of the edge node, trust identifier and signature to an industrial cloud, the industrial cloud checks the trust identifier of the edge node and verifies the signature and then further processes a preliminary computing result of the edge node, the industrial cloud transmits the computing result and the signature to the edge proxy, the edge proxy verifies the signature and then transmits the computing result to the site device;

the edge proxy collects evidence data in the above two cases, and collects 1 evidence data as one evidence collection; each round of trust update requires evidence collection for $CN_\tau$ times, and the edge node is in an operating state at this moment; the edge proxy records the number of times of evidence collection with $\varepsilon$ ($\varepsilon=1, 2, \ldots, CN_\tau$); during the $\tau^{th}$ round of trust update, the edge proxy collects evidence for $CN_\tau$ times and then conducts evidence processing and trust update operations; a time interval between every two rounds of trust updates is $\Delta T$; a computing formula of the number of times of evidence collection $CN_\tau$ required for the $\tau^{th}$ round of trust update is specified as follows:

$$CN_\tau = [6 \times \arctan[0.5 \times TI_{Ai-(\tau-1)}]] \qquad (6)$$

the edge proxy computes the number of times of evidence collection $CN_\tau$ required for the $\tau^{th}$ round of trust update according to the trust identifier of the $(\tau-1)^{th}$ time; the edge proxy rapidly updates the trust value of the edge node when the trust identifier is small and the number of times of evidence collection is less; at the initial stage of network operation, the number of times of evidence collection increases with the increase of the number of trustworthy times, in order to update the trust value in time and reduce trust computing amount, the number of times of evidence collection cannot be infinitely increased, and the maximum value of the number of times of evidence collection $$CN_\tau \text{ is } \left\lceil 6 \times \frac{\pi}{2} \right\rceil = 10;$$

(S21-1) Direct Trust Factor Collection:

the site device transmits the collected data $\alpha_{0-\tau}{}^\varepsilon$ to the edge proxy and the edge node Ai simultaneity, the site device transmits a piece of data every $\Delta t$, and the edge proxy and the edge node start processing after receiving the second collected data; the edge proxy processes a computing result of the data collected in two consecutive times as $b_{\vartheta-\tau}^{\varepsilon}$, the edge node Ai processes a computing result of the data collected in two consecutive times as $c_{\vartheta-\tau}^{\varepsilon}$, $\vartheta$ represents a serial number of evidence collected in each evidence collection, ($\vartheta=1, 2, \ldots, l$); during each evidence collection, the site device needs to transmit (l+1) data, and the data transmitted by the site device form a set $$\text{Data}_{D-\tau}^{c-\vartheta} = \{a_{0-\tau}^{\varepsilon}, a_{1-\tau}^{\varepsilon}, a_{2-\tau}^{\varepsilon}, \ldots, a_{l-\tau}^{\varepsilon}\};$$

at $t_T$, the edge proxy starts the $\tau^{th}$ round of trust update, the edge proxy collects evidence for $CN_\tau$ times in total, 1 data evidence collected for the $\varepsilon^{th}$ time including a computing result $\text{Data}_{B-\tau}^{r-\varepsilon} = \{b_{1-\tau}^{\varepsilon}, b_{2-\tau}^{\varepsilon}, \ldots, b_{\vartheta-\tau}^{\varepsilon}, \ldots, b_{l-\tau}^{\varepsilon}\}$ of the edge proxy, a computing result $\text{Data}_{Ai-\tau}^{r-\varepsilon} = \{c_{1-\tau}^{\varepsilon}, c_{2-\tau}^{\varepsilon}, \ldots, c_{\vartheta-\tau}^{\varepsilon}, \ldots, c_{l-\tau}^{\varepsilon}\}$ of the edge node Ai and a Hash value $\text{Data}_{Ai-\tau}^{h-\varepsilon} = \{h_{1-\tau}^{\varepsilon}, h_{2-\tau}^{\varepsilon}, \ldots, h_{\vartheta-\tau}^{\varepsilon}, \ldots, h_{l-\tau}^{\varepsilon}\}$ thereof, and a corresponding Hash value $\text{Data}_{Ai-\tau}^{h'-\varepsilon} = \{h_{1-\tau}^{\varepsilon'}, h_{2-\tau}^{\varepsilon'}, \ldots, h_{\vartheta-\tau}^{\varepsilon'}, \ldots, h_{l-\tau}^{\varepsilon'}\}$ computed by the edge proxy according to the computing result set $\text{Data}_{Ai-\tau}^{r-\varepsilon}$ of the edge node Ai; the edge proxy records time $t_{D-\tau}^{s-\varepsilon}$ of transmitting the first data by the site device when collecting evidence for the $\varepsilon^{th}$ time, time $t_{B-\tau}^{r-\varepsilon}$ computing the $l^{th}$ result by the edge proxy, and time $t_{Ai-\tau}^{r-\varepsilon}$ computing the $l^{th}$ result by the edge node Ai;

(S21-2) Historical Direct Trust Value Collection:

because trust dynamically changes with time, in order to avoid malicious acts, the edge proxy uses a historical direct trust value to correct a direct trust value, and the edge proxy uses a sliding window to store the historical direct trust value so as to reduce the influence of the old direct trust value on the new direct trust value; each edge node has a sliding storage window, the larger the window, the more the storage and computing overhead, so a short and small sliding storage window can limit the amount of trust computing and improve the efficiency of trust evaluation;

the sliding storage window includes u panes, each pane retains a historical direct trust value, that is, a direct trust value before the $\tau^{th}$ round of trust update is stored in the sliding storage window; a direct trust value stored in the k pane is $\text{Trust}_{Ai-(\tau-u+k-1)}^{cd}$; only when each pane has a direct trust value, the window begins to move, and moves one pane every time; a new direct trust value is added into the window after the trust is updated, while an expired direct trust value is extruded out of the window; during the $\tau^{th}$ round of trust update, direct trust values from the $(\tau-u)^{th}$ round of trust update to the $(\tau-1)^{th}$ round of trust update are stored in the window, and a direct trust value of the $\tau^{th}$ round is stored in the sliding storage window after the $\tau^{th}$ round of trust update; when a trust identifier of the edge node Ai is equal to 0, the edge node is regarded as a malicious node, and the edge proxy deletes a sliding storage window thereof;

(S21-3) Feedback Score Collection:

the edge proxy updates a final trust value of an edge node in an operating state and also needs to take into account a feedback score given to a computing result of the edge node by the site device; a rule of giving scores to edge nodes by the site device is as follows: if a safety accident occurs, the site device feeds back $d_{\vartheta-\tau}^{\varepsilon}=-1$ regardless whether a trust update is being conducted, and the edge proxy lists an edge node corresponding to the feedback score in a blacklist; otherwise, the site device feeds back scores given to computing results: bad review $d_{\vartheta-\tau}^{\varepsilon}=0$ and good review $d_{\vartheta-\tau}^{\varepsilon}=1$;

the site device feeds back the scores given to the computing results to the edge proxy, during the $\tau^{th}$ round of trust update, the edge proxy collects for $CN_\tau$ times and collects 1 feedback scores each time, and a feedback score collected by the edge proxy for the $\varepsilon^{th}$ time is $\text{Data}_{Ai-\tau}^{f-\varepsilon} = \{d_{1-\tau}^{\varepsilon}, d_{2-\tau}^{\varepsilon}, \ldots, d_{\vartheta-\tau}^{\varepsilon}, \ldots, d_{l-\tau}^{\varepsilon}\}$ including scores given, by the site device, to computing results directly returned by v edge nodes to the site device and scores given, by the site device, to computing results transmitted by (l-v) edge nodes to the industrial cloud for processing and then returned to the site device; a proxy signature based on elliptic curve is used to make the communication between the edge nodes and the industrial cloud trustworthy, no matter the computing results received by the site device come from the edge nodes or the industrial cloud, the objects to which the site device feeds back scores are edge nodes;

S22 Evidence Processing:

(S22-1) Direct Trust Factor Processing:

after collecting evidence for $CN_\tau$ times, the edge proxy respectively computes accuracy, integrity and timeliness of an edge node Ai during each evidence collection in the $\tau^{th}$ round of trust update;

(S22-1-a) the edge proxy computes accuracy of the edge node Ai according to formula (1);

(S22-1-b) the edge proxy computes integrity of the edge node Ai according to formula (2);

(S22-1-c) according to the time $t_{D-\tau}^{s-\varepsilon}$ of transmitting the first data by the site device when collecting evidence for the $\varepsilon^{th}$ time, the time $t_{B-\tau}^{r-\varepsilon}$ of computing the $l^{th}$ result by the edge proxy, and the time $t_{Ai-\tau}^{r-\varepsilon}$ computing the $l^{th}$ result by the edge node Ai, the edge proxy computes a computing efficiency $$T_{Ai-\tau}^{tm-\varepsilon} = \frac{t_{Ai-\tau}^{r-\varepsilon} - t_{D-\tau}^{s-\varepsilon}}{l}$$

of the edge node and a computing efficiency $$T_{B-\tau}^{tm-\varepsilon} = \frac{t_{B-\tau}^{r-\varepsilon} - t_{D-\tau}^{s-\varepsilon}}{l}$$

of the edge proxy, substitutes $T_{Ai-\tau}^{tm-\varepsilon}$, $T_{B-\tau}^{tm-\varepsilon}$ into formula (3), and compute timeliness of the edge node Ai;

when conducting the $\tau^{th}$ round of trust update, the edge proxy processes the collected direct trust factors by means of formula (1), formula (2) and formula (3), to obtain $CN_\tau$ values of each of accuracy, integrity and timeliness of an edge node Ai to be examined;

(S22-2) Historical Trust Value Processing:

for weight factors of historical direct trust values at different time, there is a need to take into account a time factor, that is, the longer the time of the trust value, the lower the proportion; a weight of the $k^{th}$ pane of the sliding storage window is:

$$\varphi_k = e^{-\rho(u-k)} \qquad (7)$$

where $\rho$ represents an attenuation coefficient which is 0.3; if the sliding storage window is not fully stored, u is the number of actual historical direct trust values;

according to the historical direct trust value and weight thereof in the sliding storage window, the edge proxy computes a weighted average historical trust value $\text{Trust}_{Ai-\tau}^{hd}$ of the edge node Ai in the $\tau^{th}$ round of trust update:

$$\text{Trust}_{Ai-\tau}^{hd} = \frac{\sum_{k=1}^{u} \varphi_k \times \text{Trust}_{Ai-(\tau-u+k-1)}^{cd}}{\sum_{k=1}^{u} \varphi_k} \quad (8)$$

(S22-3) Feedback Score Processing:

for an edge node with a feedback score of −1, the security administrator replaces the edge node with an edge node to be added, and the edge proxy repeats an initial trust value computing step, to evaluate an initial trust value of the edge node to be added;

according to the feedback score, the edge proxy computes reward and penalty factors of the edge node Ai in the $\tau^{th}$ round of trust update; and according to a difference $\Delta N_{Ai-\tau}^{\varepsilon} = N_{Ai-\tau}^{g-\varepsilon} - \lfloor 1 \times (1 - ER_{Ai}) \rfloor$ between the total number of times of good review $N_{Ai-\tau}^{g-\varepsilon}$ during evidence collection for the $\varepsilon^{th}$ time and the minimum required number of correct computing results, the edge proxy computes a reward factor $E_{Ai-\tau}^{g-\varepsilon}$ and a penalty factor $E_{Ai-\tau}^{b-\varepsilon}$ corresponding to the evidence collection for the $\varepsilon^{th}$ time, where $N_{Ai-\tau}^{g-\varepsilon} = \Sigma_{\vartheta=1}^{l} d_{\vartheta-\tau}^{\varepsilon}$, $ER_{Ai}$ is the error rate that the edge node is allowed to calculate in an industrial production environment;

if $\Delta N_{Ai-\tau}^{\varepsilon} \geq 0$, the reward factor and penalty factor corresponding to the evidence collection for the $\varepsilon^{th}$ time are $E_{Ai-\tau}^{g-\varepsilon} = 0.3[(1+e^{-\Delta N_{Ai-\tau}^{\varepsilon}})^{-1} - 0.5]$ and $E_{Ai-\tau}^{b-\varepsilon} = 0$ respectively; otherwise, the reward factor and penalty factor corresponding to the evidence collection for the $\varepsilon^{th}$ time are $E_{Ai-\tau}^{g-\varepsilon} = 0$ and $E_{Ai-\tau}^{b-\varepsilon} = 0.4[(1+e^{-\Delta N_{Ai-\tau}^{\varepsilon}})^{-1} - 0.5]$ respectively; the reward degree is small and the penalty degree is large, which reflects the characteristic that the trust value is slowly increased and quickly decreased;

the edge proxy computes a final reward or penalty factor $E_{Ai-\tau}^{f}$ according to the reward and penalty factors in the $\tau^{th}$ round of trust update:

$$E_{Ai-\tau}^{f} = \begin{cases} 0, & \exists d_{\vartheta-\tau}^{\varepsilon} = -1 \\ \frac{\sum_{z=1}^{CN_{\tau}} [E_{Ai-\tau}^{\vartheta-\varepsilon} + E_{Ai-\tau}^{b-\varepsilon}]}{CN_{\tau}}, & \forall d_{\vartheta-\tau}^{\varepsilon} \neq -1 \end{cases} \quad (9)$$

good feedback from the field device increases the trust value of the edge node Ai and bad feedback rapidly decreases the trust value of the edge node Ai; if there is safety accident feedback from the site device, $E_{Ai-\tau}^{f}$ appears as a penalty factor, $E_{Ai-\tau}^{f} = 0$; if there is no safety accident feedback, $E_{Ai-\tau}^{f} > 0$ represents reward, $E_{Ai-\tau}^{f} < 0$ represents penalty, and $E_{Ai-\tau}^{f} = 0$ represents neither reward nor penalty;

S23 Trust Update:

according to the direct trust value, historical trust value and feedback scores, the edge proxy updates the trust value of the edge node, the edge node is in a to-be-examined state at this moment; a time interval between every two rounds of trust updates is $\Delta T$;

(S23-1) Computing Direct Trust Value:

the edge proxy repeats the step of computing a direct trust value when evaluating initial trust, and computes a direct trust value $\text{Trust}_{Ai-\tau}^{cd}$ of the edge node Ai to be examined of which the judgment result is trustworthy or uncertain in the $\tau^{th}$ round of trust update by means of formula (4); for an edge node to be examined of which the judgment result is untrustworthy, the edge proxy directly lists the edge node in a blacklist;

(S23-2) Correcting Direct Trust Value:

before computing the final trust value, the edge proxy needs to correct the direct trust value by using the weighted average historical direct trust value; the edge proxy weights and aggregates $\text{Trust}_{Ai-\tau}^{cd}$ and $\text{Trust}_{Ai-\tau}^{hd}$ of the edge node Ai to obtain a corrected direct trust value $\text{Trust}_{Ai-\tau}^{d}$ the edge node Ai in the $\tau^{th}$ round of trust update:

$$\text{Trust}_{Ai-\tau}^{d} = \delta \times \text{Trust}_{Ai-\tau}^{cd} + (1-\delta) \times \text{Trust}_{Ai-\tau}^{hd} \quad (10)$$

where $\delta$ is used to balance proportions of current trust and historical trust, and $\delta$ is defined as follows:

$$\delta = \begin{cases} \delta_1, & \text{Trust}_{Ai-\tau}^{cd} \geq \text{Trust}_{Ai-\tau}^{hd} \\ \delta_2, & \text{Trust}_{Ai-\tau}^{cd} < \text{Trust}_{Ai-\tau}^{hd} \end{cases} \quad (11)$$

where $0 < \delta_1 < \delta_2 < 1$, it is specified that $\delta_1 = 0.3$, $\delta_2 = 0.7$, the value of $\delta_1$ is small, to prevent the edge node from accumulating trust thereof quickly, and the value of $\delta_2$ is large, which reflects a penalty for a malicious act of the edge node;

(S23-3) Updating Final Trust Value:

according to the reward or penalty factor computed in formula (9), the edge proxy computes a final trust value of the edge node to be examined;

a computing formula of the final trust value $\text{Trust}_{Ai-\tau}^{u}$ of the edge node Ai in the $\tau^{th}$ round of trust update is as follows:

$$\text{Trust}_{Ai-\tau}^{u} = \begin{cases} E_{Ai-\tau}^{f} \times \text{Trust}_{Ai-\tau}^{d}, & \exists d_{\vartheta-\tau}^{\varepsilon} = -1 \\ E_{Ai-\tau}^{f} + \text{Trust}_{Ai-\tau}^{d}, & \forall d_{\vartheta-\tau}^{\varepsilon} \neq -1 \end{cases} \quad (12)$$

if a certain feedback score is −1, the final trust value of the edge node Ai in the $\tau^{th}$ round of trust update is equal to 0; otherwise, the final trust value of the edge node Ai in the $\tau^{th}$ round of trust update is equal to a corrected direct trust value of the edge node Ai plus a reward or penalty factor;

(S23-4) Computing Trust Identifier:

after trust update, the edge proxy compares the final trust value of the edge node to be examined with a trust value in Table 2-trust level table, and then computes a trust identifier of the edge node Ai according to the judgment result and the final trust value, rules are as follows:

TABLE 2

Trust Level Table

| Trust Level | Trust Description | Trust Value Range |
| --- | --- | --- |
| 1 | Untrustworthy | [0, $\beta_u$) |
| 2 | Uncertain | [$\beta_u$, $\beta_c$) |
| 3 | Trustworthy | [$\beta_c$, 1] |

(S23-4-a) for an edge node of which the trust value level is a trustworthy level, the edge proxy computes a trust identifier $TI_{Ai-\tau}$ thereof according to formula (13), computes valid time $T_{Ai-\tau}^{v}$ the trust identifier according to formula (14), and then stores trust associated information thereof locally according to a data structure in Table 6;

TABLE 6

| | | | | | Trust Associated Data of Edge Node Ai | | | | |
|---|---|---|---|---|---|---|---|---|---|
| Time | Node identity identifier | Accuracy membership degree mean | Integrity membership degree mean | Timeliness membership degree mean | Corrected direct trust value | Reward and penalty | Final trust value | Trust identifier | Valid time |
| $t_\tau$ | $ID_{Ai}$ | $\overline{\mu_{1\text{-}\tau}}$ | $\overline{\mu_{1\text{-}\tau}}$ | $\overline{\mu_{1\text{-}\tau}}$ | $Trust_{Ai\text{-}\tau}^{d}$ | $E_{Ai\text{-}\tau}^{f}$ | $Trust_{Ai\text{-}\tau}^{u}$ | $TI_{Ai\text{-}\tau}$ | $T_{Ai\text{-}\tau}^{v}$ | a specific computing formula of the trust identifier of the edge node Ai in the $\tau^{th}$ round of trust update is as follows:

$$TI_{Ai-\tau} = \begin{cases} 0, & Trust_{Ai-\tau}^{d} < \beta_u \\ TI_{Ai-(\tau-1)}, & \beta_u \leq Trust_{Ai-\tau}^{d} < \beta_c \\ TI_{Ai-(\tau-1)} + 1, & Trust_{Ai-\tau}^{d} \geq \beta_c \end{cases} \quad (13)$$

a computing formula of the valid time $T_{Ai\text{-}\tau}^{v}$ of the trust identifier of the trust value is as follows:

$$T_{Ai-\tau}^{v} = 6 \times CN_\tau \times l \times (\overline{T_{Ai\text{-}\tau}} + \Delta t) + TI_{Ai-\tau} \times \Delta T \quad (14)$$

where $CN_\tau$ represents a number of times of evidence collection required in the $\tau^{th}$ round of trust update, l represents a data amount of evidence collection each time, $\overline{T_{Ai\text{-}\tau}}$ represents an average computing efficiency $$\overline{T_{Ai-\tau}} = \frac{\sum_{k=1}^{CN_\tau} T_{Ai-\tau}^{tm-\varepsilon}}{CN_\tau}$$

of edge nodes Ai, $\Delta t$ represents a time interval at which the site device transmits data, $\Delta T$ represents a time interval between trust updates, and the valid time is in second; if a trust identifier of an edge node is expired, the edge proxy lists the edge node in a blacklist;

(S23-4-b) for an edge node of which the trust level is an uncertain level, a trust identifier thereof is unchanged; the edge proxy checks the trust identifier thereof, and if the number of times of continuous equality of the trust identifier is less than 3, the edge proxy allows the edge node to operate; otherwise, the edge proxy lists the edge node in a blacklist, and then the edge node is in an isolation state;

(S23-4-c) for an edge node of which the trust level is an untrustworthy level, the edge proxy lists the edge node in a blacklist directly, and then the edge node is in an isolation state; the edge proxy broadcasts identity information about the edge node in the blacklist and a trust identifier 0 thereof, and reports to the security administrator to replace the edge node; after the security administrator replaces the isolated edge node with an edge node to be added, the edge proxy repeats an initial trust value computing step, to separately evaluate an initial trust value of the edge node to be added;

trust associated data of the edge node Ai includes start time $t_\tau$ of the $\tau^{th}$ round of trust update, a node identity identifier $ID_{Ai}$, an average accuracy membership degree $\overline{\mu_{1\text{-}\tau}}$, an integrity membership degree mean $\overline{\mu_{2\text{-}\tau}}$, a timeliness membership degree mean $\overline{\mu_{3\text{-}\tau}}$, a corrected direct trust value $Trust_{Ai\text{-}\tau}^{d}$, a reward or penalty factor $E_{Ai\text{-}\tau}^{f}$, a final trust value $Trust_{Ai\text{-}\tau}^{u}$, a trust identifier $TI_{Ai\text{-}\tau}$ and valid time $T_{Ai\text{-}\tau}^{v}$;

the edge proxy transmits the trust identifier to the site device, the site device decides whether to transmit data according to the trust identifier of the edge node, and transmits data to an edge node with a trust identifier greater than 0 rather than to an edge node with a trust identifier equal to 0;

after $\Delta T$ time, the edge proxy repeatedly executes the steps of evidence collection, evidence processing and trust update.

\* \* \* \* \*